(12) United States Patent
Kasahara et al.

(10) Patent No.: US 8,587,545 B2
(45) Date of Patent: Nov. 19, 2013

(54) INFORMATION PROCESSING APPARATUS, INFORMATION PROCESSING METHOD, AND COMPUTER-READABLE STORAGE MEDIUM

(75) Inventors: Shunichi Kasahara, Kanagawa (JP); Tomoya Narita, Kanagawa (JP); Ritsuko Kano, Tokyo (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 13/185,914

(22) Filed: Jul. 19, 2011

(65) Prior Publication Data

US 2012/0026113 A1    Feb. 2, 2012

(30) Foreign Application Priority Data

Jul. 28, 2010    (JP) ................ P2010-169103

(51) Int. Cl.
   *G06F 3/041*    (2006.01)

(52) U.S. Cl.
   USPC ........................................ 345/173

(58) Field of Classification Search
   USPC ............ 345/173, 174, 156, 661, 7; 348/345, 348/333.01, 333.02
   See application file for complete search history.

(56) References Cited

U.S. PATENT DOCUMENTS

| | | | |
|---|---|---|---|
| 6,720,938 B2 * | 4/2004 | Ohkawara et al. ................ 345/7 |
| 6,987,538 B1 * | 1/2006 | Nakata et al. ................ 348/345 |
| 2007/0188022 A1 * | 8/2007 | Itabashi et al. ................ 307/9.1 |
| 2010/0159998 A1 * | 6/2010 | Luke et al. ................ 455/567 |
| 2011/0050974 A1 * | 3/2011 | Nakai et al. ............ 348/333.01 |
| 2011/0157006 A1 * | 6/2011 | Miyazawa et al. ........... 345/156 |
| 2011/0164063 A1 * | 7/2011 | Shimotani et al. ........... 345/661 |
| 2011/0249165 A1 * | 10/2011 | Churei .................... 348/333.02 |
| 2012/0044170 A1 * | 2/2012 | Homma et al. ............... 345/173 |

* cited by examiner

*Primary Examiner* — Fred Tzeng
(74) *Attorney, Agent, or Firm* — Sherr & Jiang, PLLC

(57) ABSTRACT

A method is provided for controlling devices. The method includes detecting an operating member placed in proximity to a display device. The method further includes changing a display formation of a plurality of objects displayed on the display device based on the detected operating member, and displaying the objects on the display device according to the changed display formation.

25 Claims, 17 Drawing Sheets

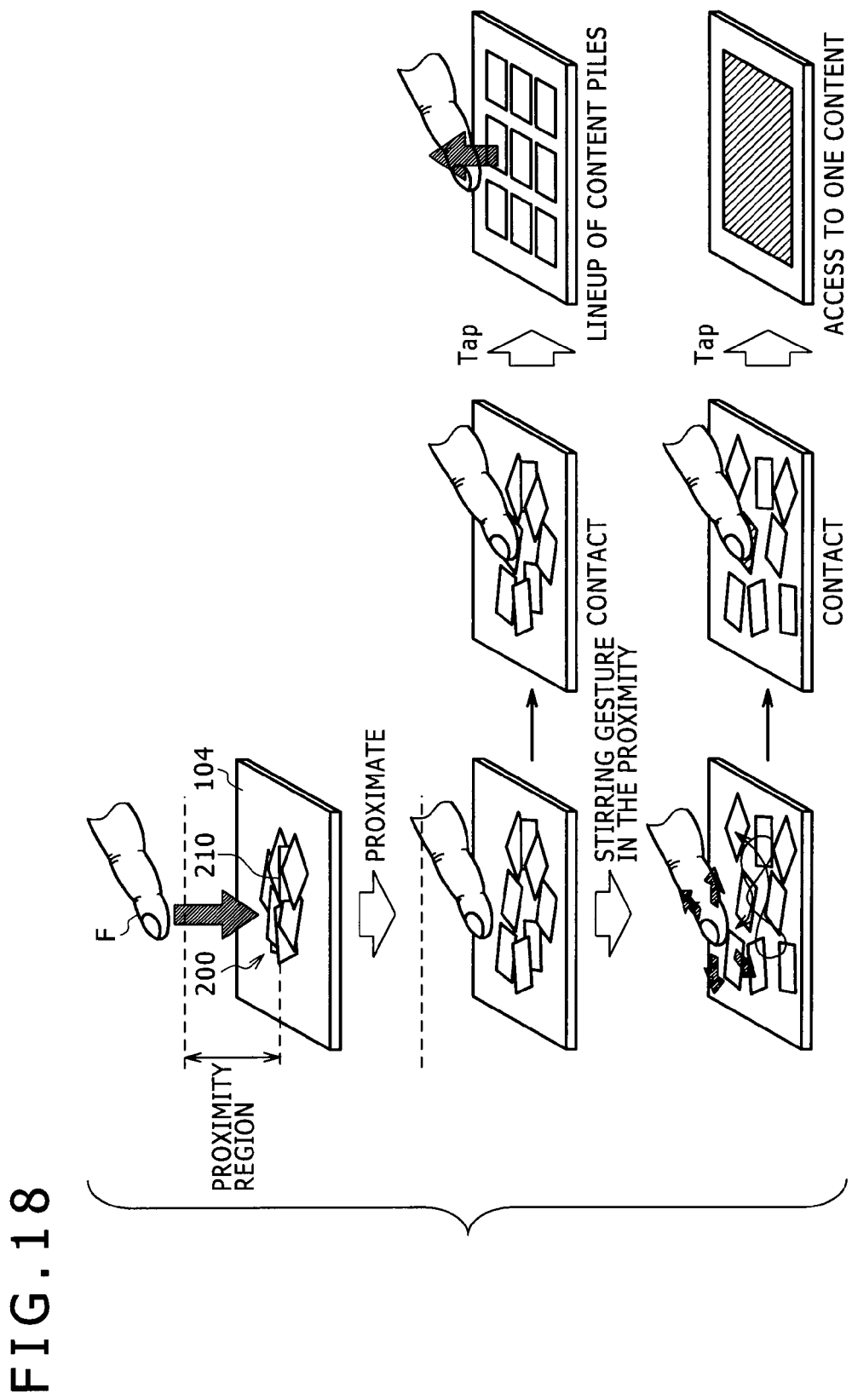

INFORMATION PROCESSING APPARATUS, INFORMATION PROCESSING METHOD, AND COMPUTER-READABLE STORAGE MEDIUM

BACKGROUND

This disclosure relates to an information processing apparatus, an information processing method and a computer-readable storage medium.

A touch panel is popularly used in a ticketing apparatus for transportation, an ATM (automatic teller machine) of a bank and so forth because it can be used to implement a user interface which is intuitive and easy to use. In recent years, the touch panel can detect an operation of a user and can be used to implement operation of an apparatus different from an operation of buttons. Therefore, in recent years, a touch panel is used frequently in portable apparatus such as a portable telephone set or a game machine. For example, Japanese Patent Laid-Open No. 2010-55455 discloses an information processing apparatus which makes it possible for a user to confirm a plurality of images efficiently by a user interface which uses a touch panel and to carry out a confirmation operation simply, conveniently and intuitively.

However, in a touch panel in the past, the information of a finger which can be detected is only a state of a finger in which the finger contacts with the touch panel. Therefore, until after a finger is brought into contact with the touch panel, the apparatus cannot be operated. Further, the user cannot recognize what process is to be executed when a finger contacts with the touch panel until after it contacts at a finger thereof with the touch panel.

Meanwhile, in order to confirm the plurality of screens efficiently, as a user interface which can improve the overlooking property upon browsing of a content and can be rapidly grasped generally, a thumbnail representation is effective. However, there is a problem that, in the case where the thumbnail representation is used, if a large number of contents are involved, then it is difficult for a user to grasp unity of contents related to each other and use a hierarchical overlooking state of the contents. Otherwise if a plurality of contents are treated as a group and aggregated into a folder or a thumbnail representation, then a macroscopic overlooking property can be improved. However, in the case where an aggregated representation of a content group is used, it is difficult to overlook individual contents.

Therefore, it is desirable to provide a novel and improved information processing apparatus, information processing method, and computer-readable storage medium which allow a user to understand a relationship between a variation of a user interface and an operation of the user readily and can be operated intuitively.

SUMMARY

Accordingly, there is provided an apparatus for controlling devices. The apparatus includes a detecting unit for detecting an operating member placed in proximity to a display device. The apparatus further includes a changing unit for changing a display formation of a plurality of objects displayed on the display device based on the detected operating member, and a display generator for displaying the objects on the display device according to the changed display formation.

In another embodiment, there is provided a method for controlling devices. The method includes detecting an operating member placed in proximity to a display device. The method further includes changing a display formation of a plurality of objects displayed on the display device based on the detected operating member, and displaying the objects on the display device according to the changed display formation.

In another embodiment, there is provided a tangibly-embodied non-transitory computer-readable storage medium storing instructions which, when executed by a processor, cause a computer to perform a method controlling devices. The method includes detecting an operating member placed in proximity to a display device. The method further includes changing a display formation of a plurality of objects displayed on the display device based on the detected operating member, and displaying the objects on the display device according to the changed display formation.

According to the embodiments described above, there are provided an information processing apparatus, information processing method, and computer-readable storage medium, whereby a relationship between a change of the user interface and an operation of a user can be understood readily and an intuitive operation can be carried out.

BRIEF DESCRIPTION OF THE DRAWINGS

FIGS. 17 and 18 are schematic views illustrating different examples of an interaction after expansion of a content group.

DETAILED DESCRIPTION OF THE PREFERRED EMBODIMENT

Figure 1:
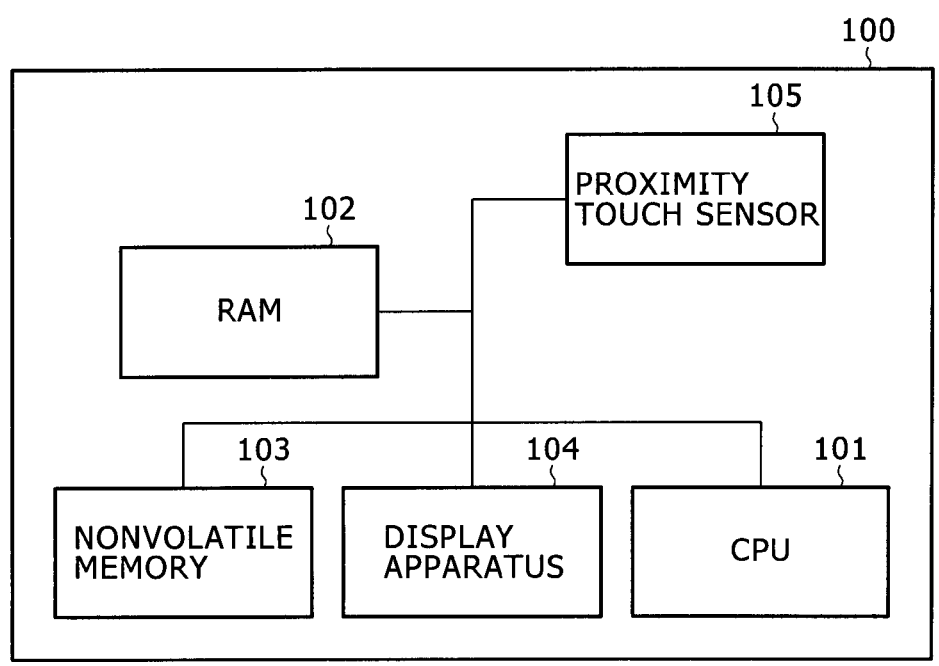
FIG. 1 is a block diagram showing an example of a hardware configuration of an information processing apparatus according to an embodiment of the present disclosure.

In the following, an embodiment of the present disclosure is described in detail with reference to the accompanying drawings. In the specification and the accompanying drawings, substantially like parts or elements having substantially like functional configurations are denoted by like reference characters, and overlapping description of the same is omitted herein to avoid redundancy.

It is to be noted that the description is given in the following order:
1. Configuration of the Information Processing Apparatus and Display Changing Process of a Content Group
2. Variation
<1. Configuration of the Information Processing Apparatus and Display Changing Process of a Content Group>
[Example of the Hardware Configuration of the Information Processing Apparatus]

Figure 2:
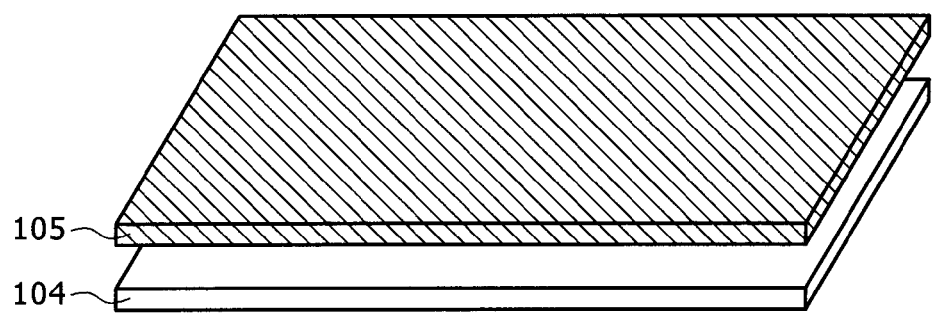
FIG. 2 is a schematic perspective view of an example of a hardware configuration of the information processing apparatus.

First, an example of a hardware configuration of an information processing apparatus according to an embodiment of the disclosure is described with reference to FIGS. 1 and 2. It is to be noted that FIG. 1 is a block diagram showing an example of a hardware configuration of an information processing apparatus 100 according to the present embodiment. FIG. 2 is a schematic perspective view of an example of a hardware configuration of the information processing apparatus 100 according to an embodiment of the present disclosure.

The information processing apparatus 100 according to the present embodiment includes a detection section, i.e., a detecting unit, which can detect a contact position of an operating body, i.e., an operating member, placed on a display face of a display apparatus. The detection section can further detect a proximity distance between the display face of the display apparatus and an operating body positioned above the display face, and can detect the operating body in the x-axis, y-axis, or z-axis directions. The information processing apparatus 100 may have various forms such as, for example, an apparatus which includes a display apparatus of a large size such as a television set or a display unit of a personal computer or an apparatus which includes a display unit of a small size such as a personal digital assistant or a smartphone irrespective of the function or the size.

Referring particularly to FIG. 1, the information processing apparatus 100 according to the present embodiment includes a central processing unit (CPU) 101, a random access memory (RAM) 102, a nonvolatile memory 103, a display apparatus 104 and a proximity touch sensor 105.

The CPU 101 functions as an arithmetic processing unit and a control apparatus as described hereinabove and controls general operation of the components of the information processing apparatus 100 in accordance with various programs. The CPU 101 may be a microprocessor. The RAM 102 temporarily stores programs to be used in execution of the CPU 101 and parameters and so forth which suitably vary in the execution. The CPU 101 and the RAM 102 are connected to each other by a host bus configured from a CPU bus or the like. The nonvolatile memory 103 may be a tangibly-embodied non-transitory computer-readable storage medium that stores instructions, programs, calculation parameters and so forth to be used by the CPU 101. The nonvolatile memory 103 can be formed using, for example, a read only memory (ROM), a flash memory or the like.

The display apparatus 104 is an example of an outputting apparatus which outputs information. The display apparatus 104 may be configured using, for example, a liquid crystal display (LCD) apparatus, an OLED (Organic Light Emitting Diode) apparatus or the like. The proximity touch sensor 105 is an example of an inputting apparatus used by a user to input information and is configured from an inputting block for inputting information, a control circuit for producing an input signal based on an input by the user and outputting the input signal to the CPU 101, and so forth.

In the information processing apparatus 100 according to the present embodiment, the proximity touch sensor 105 is provided in a laminated relationship on the display face of the display apparatus 104 as seen in FIG. 2. Consequently, when a user positions an operating body such as a finger in the proximity of the display face of the display apparatus 104, the distance from the display face to the finger can be detected by the proximity touch sensor 105.

[Input of Operation Information to the Information Processing Apparatus]

In the information processing apparatus 100 having such a configuration as described above, if the user positions an operating body such as a finger in the proximity of the display face of the display apparatus 104, then a proximity distance between the display face and the operating body is detected by the proximity touch sensor 105. The information processing apparatus 100 changes the display form, i.e., the display formation, of information to be displayed on the display apparatus 104 in response to the proximity distance, and a display generator displays the objects according to the changed display form. Consequently, the user can surmise a process to be executed later, a process executable later or the like from the change of the display form of information before the operating body is brought into contact with the display face.

Particularly in the information processing apparatus 100 of the present embodiment, when a plurality of objects such as icons or thumbnail images associated with contents are displayed, unity of objects is presented in clarity to the user and the individual objects can be overlooked. For example, the information processing apparatus 100 causes the display apparatus 104 to display piles of objects (hereinafter referred to as "content piles") 210 individually associated with the contents. At this time, the information processing apparatus 100 collects those content piles 210 which have some relationship to each other such as a genre or a production date and hour to form a content group 200 including the content piles 210 having the relationship to each other. The content group 200 is displayed in a form in which the content piles 210 overlap with each other, that is, in an aggregated state or in a collapsed formation, for example, as seen in an upper figure of FIG. 3. Consequently, the user can carry out macroscopic overlooking depending upon the content group 200.

Here, if a content group 200 is displayed in an aggregated form, since the content piles 210 overlap with each other, the user cannot visually observe the substance described in the individual content piles 210. In addition, it is difficult for the user to find out the content piles 210 to select them. The content piles 210 are associated with desired contents from the content piles 210 which configure the content group 200. Therefore, in the information processing apparatus 100 according to the present embodiment, the proximity touch sensor 105 is used to change the display form of the content group 200 in response to the proximity distance between the operating body such as a finger F and the display face of the display apparatus 104. Depending upon the changing display form, the user can recognize a process to be executed subsequently or an available operation before the operating body is brought into contact with the display face and can carry out an operation agreeably and with feeling at rest.

Figure 3:
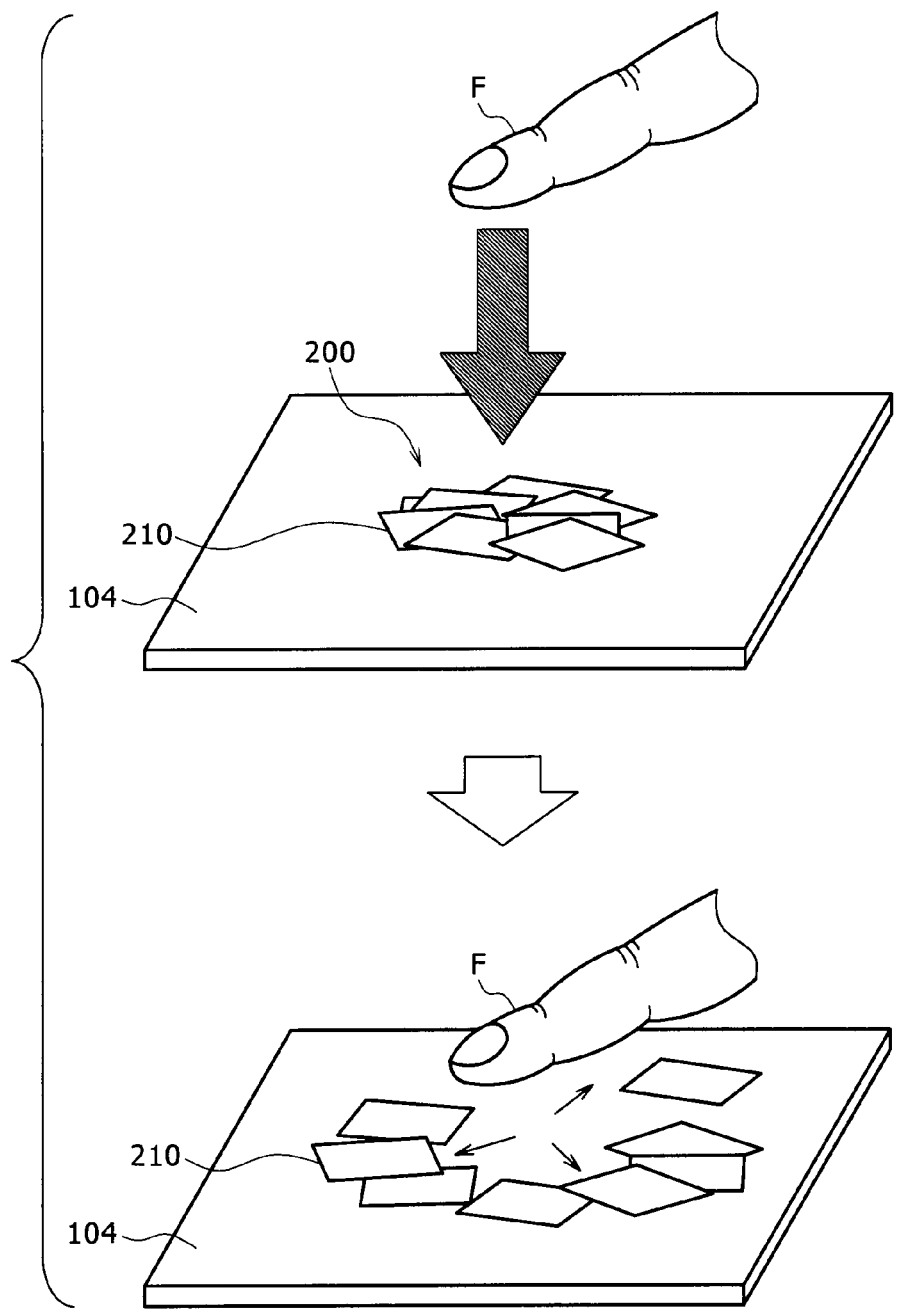
FIG. 3 is a schematic view illustrating a display state of an object in response to the distance between an operating member and a display face of the information processing apparatus.

As a change of the display form of the content group 200 when the finger F approaches the display face of the display apparatus 104, the display form of the content piles 210 which configure a content group 200 changes from an aggregated state to such a form that the content piles 210 overlapping with each other are expanded substantially circularly or radially, that is, to a preview state or an expanded formation, for example, as seen from a lower side view in FIG. 3. In the case where the content piles 210 overlapping with each other are expanded, it is possible for the user to visually observe information described on the content piles 210.

In the following, a functional configuration of the information processing apparatus 100 according to the present embodiment and displaying processes by the functional configuration are described in detail with reference to FIGS. 4 to 18.

[Functional Configuration]

Figure 4:
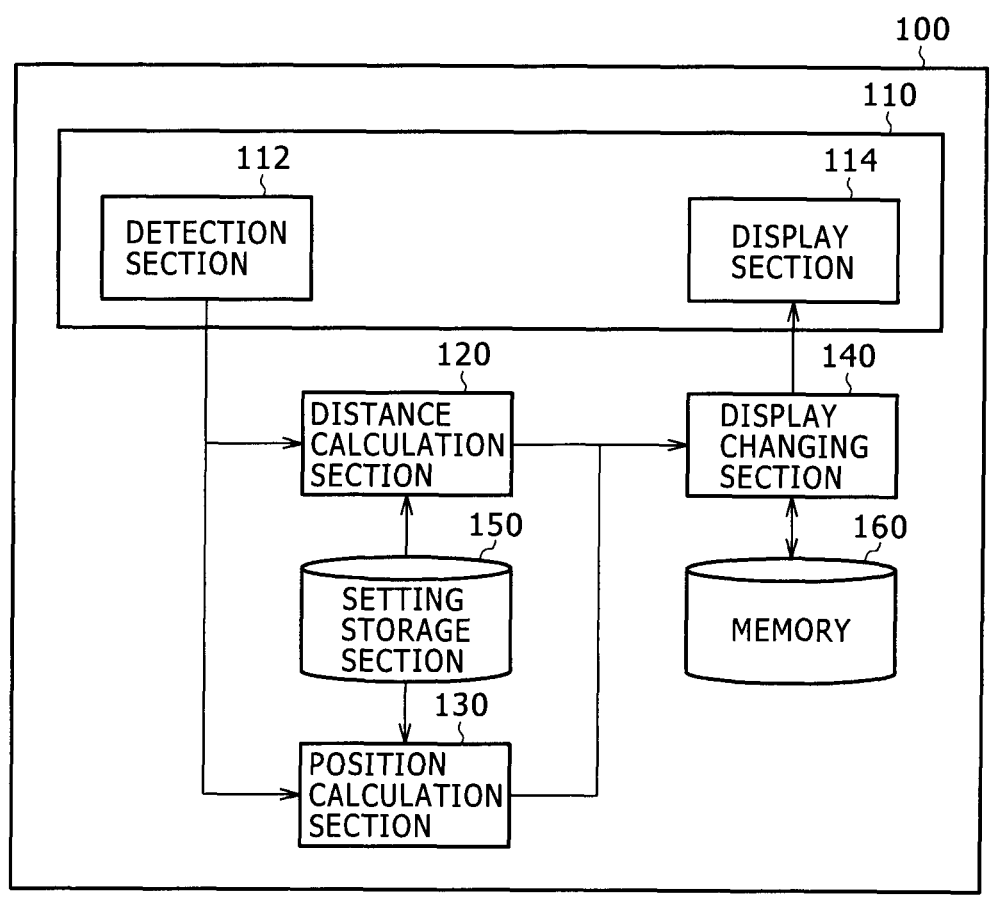
FIG. 4 is a functional block diagram showing a functional configuration of the information processing apparatus.

First, a functional configuration of the information processing apparatus 100 according to the present embodiment is described with reference to FIG. 4. It is to be noted that FIG. 4 is a functional block diagram showing a functional configuration of the information processing apparatus 100 according to the present embodiment. The information processing apparatus 100 includes an inputting displaying portion 110, a distance calculation section 120, a position calculation section 130, a display changing section 140, (i.e., a changing unit), a setting storage section 150 and a memory 160.

The inputting displaying block 110 is a functioning section for displaying information and inputting information, and includes a detection section 112 and a display section 114. The detection section 112 corresponds to the proximity touch sensor 105 shown in FIG. 1 and can be configured using, for example, a touch panel of the electrostatic type. In this instance, the detection section 112 detects the value of the capacitance which varies in response to the proximity distance between an operating body and the display face of the display section 114. If the operating body comes nearer than a predetermined distance to the display face, then the capacitance detected by the detection section 112 increases, and as the operating body further approaches, the capacitance increases. Then, when the operating body is brought into contact with the display face, then the capacitance detected by the detection section 112 exhibits a maximum value. Based on such value of the capacitance detected by the detection section 112, the distance calculation section 120 hereinafter described can calculate the proximity distance of the operating member with respect to the display face of the display section 114. The detection section 112 outputs the detected value of the capacitance as a detection result to the distance calculation section 120.

Further, in order to specify the position of the operating body on the display face of the display section 114 from the detection result of the detection section 112, the detection result is outputted also to the position calculation section 130 hereinafter described.

The display section 114 is an outputting apparatus for outputting information which corresponds to the display apparatus 104 shown in FIG. 1. The display section 114 displays, for example, content piles 210 or the substance of a content associated with a content pile 210. Further, in the case where the display form of the content group 200 is changed by the display changing section 140, a notification of the changed display information of the content group 200 is transmitted from the display changing section 140 to the display section 114, and the content group 200 is displayed in the display form after the change on the display section 114.

The distance calculation section 120, i.e. a calculating unit, calculates the proximity distance between the operating body and the display face of the display section 114 based on a detection result inputted thereto from the detection section 112. As described hereinabove, as the value of the capacitance detected by the detection section 112 increases, the operating body and the display face are positioned nearer to each other, and when the operating body contacts with the display face, the capacitance exhibits a maximum value. The corresponding relationship between the value of the capacitance and the proximity distance is stored in advance in the setting storage section 150 hereinafter described. The distance calculation section 120 refers to the setting storage section 150 in response to the value of the capacitance inputted from the detection section 112 to calculate the proximity distance between the operating body and the display face. The calculated proximity distance is outputted to the display changing section 140.

The position calculation section 130 specifies the position of the operating body on the display face of the display section 114 based on a detection result inputted thereto from the detection section 112. Although details are hereinafter described, a changing process of the display form of the content group 200 is executed in the case where the operating body is positioned in a decision region, i.e. a content manipulation region, set for the object 210. In order to decide whether or not the changing process of the display form of the content group 200 is to be executed, or in other words, in order to decide whether or not the operating body is positioned within the decision region, the position calculation section 130 calculates the position of the operating body on the display face.

For example, it is assumed that the detection section 112 is configured from an electrostatic sensor substrate on which electrostatic detection grids for detecting an x coordinate and a y coordinate are formed. At this time, the detection section 112 can specify the contact coordinates of the operating body on the substrate, that is, on the display face, from a variation of the capacitance of each grid in response to the contact of the operating body. The position calculation section 130 outputs position information representative of the specified position of the operating body.

The display changing section 140 changes the display form of the object 210 displayed on the display section 114 in response to the proximity distance between the operating body and the display face. The display changing section 140 decides based on the proximity distance inputted thereto from the distance calculation section 120 whether or not the proximity distance between the operating body and the display face is within a proximity region which is a region in which the proximity distance is shorter than a predetermined distance. Further, the display changing section 140 decides based on the position information of the operating body inputted from the position calculation section 130 whether or not the operating body is positioned within the decision region on the display face. The display changing section 140 changes the display form of the content group 200 in response to the proximity distance in the case where the operating body is positioned within the proximity region and within the decision region.

As the display form of the content group 200, for example, a display form of an aggregated state in which a plurality of content piles 210 assemble in an overlapping relationship with each other, another display form of a preview state in which the content piles 210 are spread from the aggregated state and information described on the content piles 210 can be confirmed, and so forth are available. It is to be noted that a changing process of the display form of the content group 200 by the display changing section 140 is hereinafter described. If it is decided that the display form of the content group 200 is to be changed, then the display changing section 140 produces an image of the display form of the content group 200 after the change and outputs the produced image to the display section 114.

The setting storage section 150 stores information to be used upon calculation of the proximity distance between the operating body and the display face and production of position information of the operating body on the display face and in a changing process of the display form of the content group 200 as setting information. The setting storage section 150 stores, for example, a corresponding relationship between values of the capacitance and proximity distances such that the distance calculation section 120 can refer to the corresponding relationship to calculate the proximity distance corresponding to the value of the capacitance inputted from the detection section 112. Further, the setting storage section 150 stores decision regions set individually for the content groups 200 and to be used for decision of whether or not the changing process of the display form is to be executed. The position calculation section 130 refers to the decision regions stored in the setting storage section 150 to decide whether or not the position information of the operating body specified from a detection result of the detection section 112 is positioned in one of the decision regions for the content groups 200.

Also it is possible for the setting storage section 150 to store a proximity region determined in response to the proximity distance between the operating body and the display face. The set proximity region can be utilized for decision of whether or not the changing process of the display form is to be executed, for example, such that, where the region within which the proximity distance between the operating body and the display face is shorter than a threshold distance is determined as a first proximity region, the display form of the content group 200 is changed when the operating body is positioned in the first proximity region. A plurality of proximity regions may be set.

The memory 160 is a storage section for temporarily storing information necessary for the changing process of the display form of the content group 200 and so forth. For example, the memory 160 stores a history of the proximity distance between the operating body and the display face, a change history of the display form of the content group 200 and so forth. The memory 160 may be accessed and referred to not only by the display changing section 140 but also by some other functioning sections such as the distance calculation section 120 and the position calculation section 130.

[Changing Process of the Display Form of a Content Group]

Figure 5:
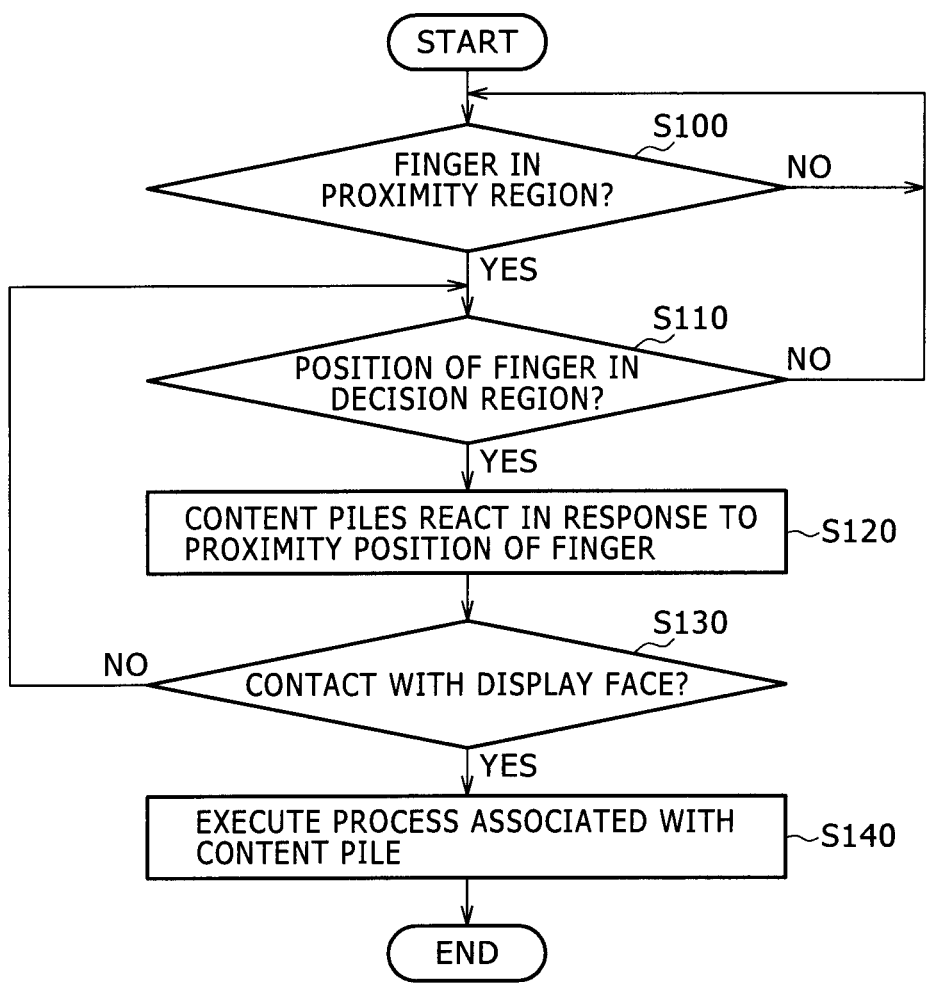
FIG. 5 is a flow chart illustrating a changing process of a display mode of an object group by the information processing apparatus.
Figure 6:
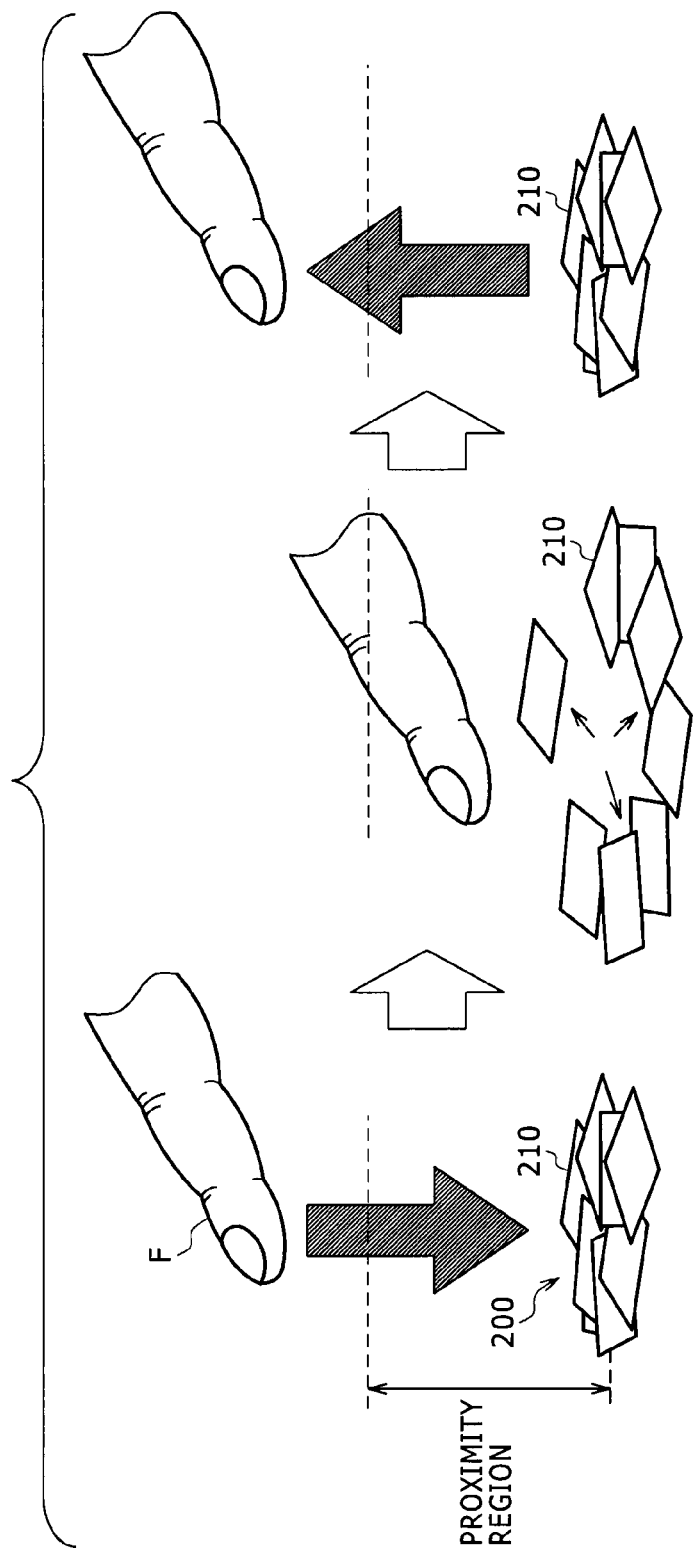
FIG. 6 is a schematic view illustrating a display mode of an object group according to the position of a finger by the information processing apparatus.
Figure 7:
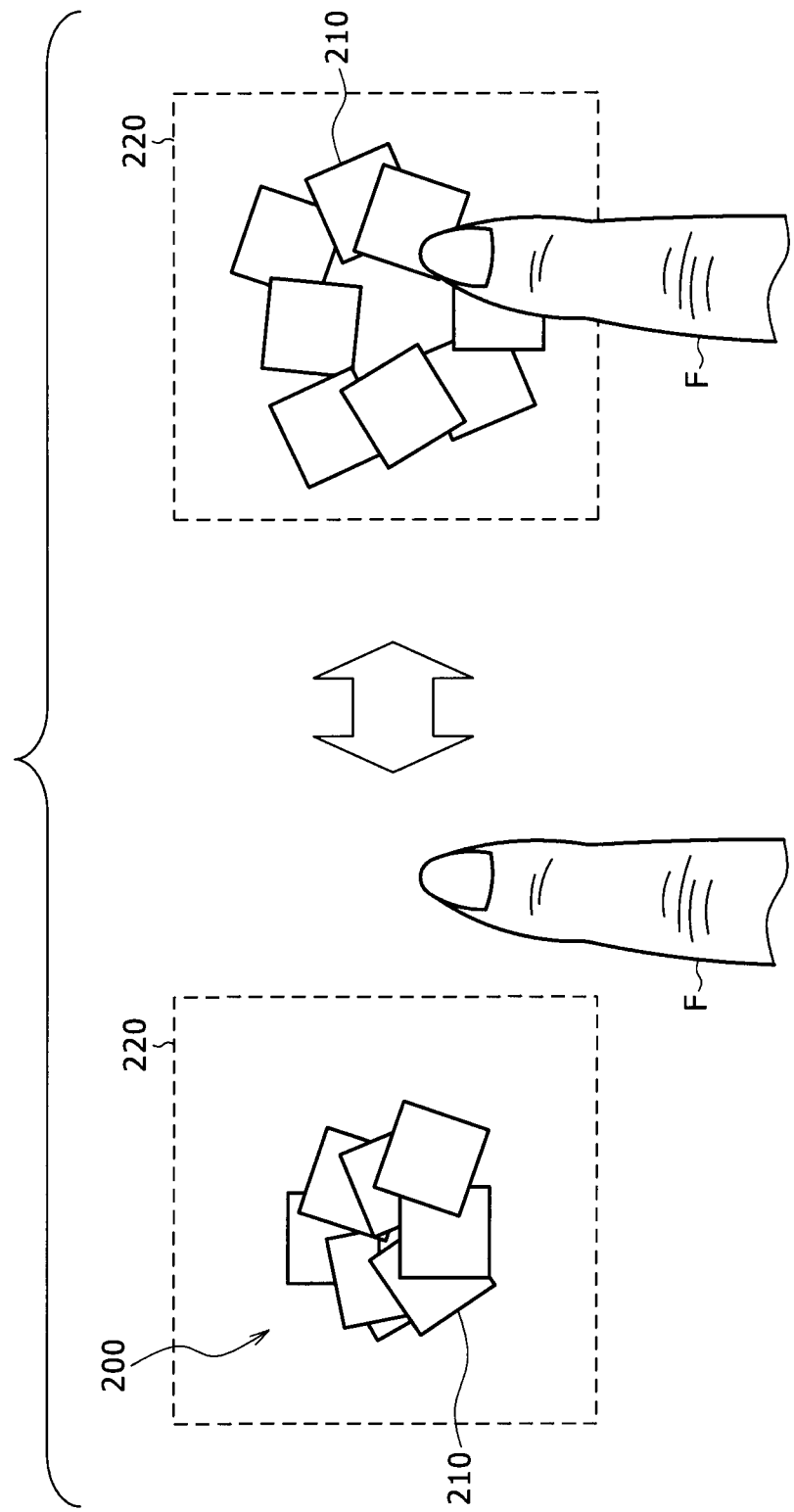
FIGS. 7 and 8 are schematic views illustrating different examples of a decision region in the information processing apparatus.
Figure 8:
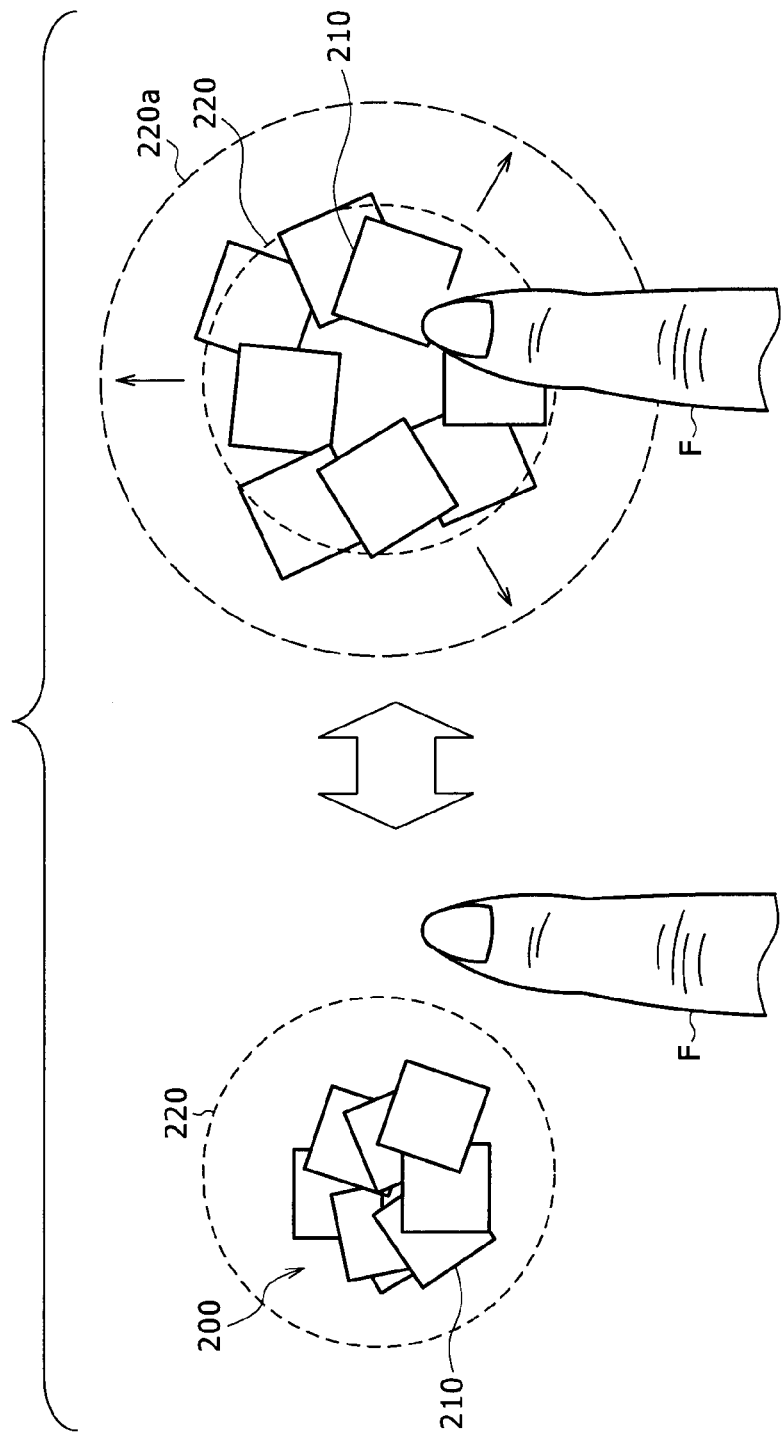

The information processing apparatus 100 having such a functional configuration as described above changes the display form of the content group 200 before the operating body is brought into contact with the display face in response to the proximity distance between the operating body and the display face as described above. The changing process of the display form of the content group 200 is described below with reference to FIGS. 5 to 8. It is to be noted that FIG. 5 is a flow chart illustrating a changing process of a display mode of a content group 200 according to the present embodiment. FIG. 6 is a schematic view illustrating a display mode of a content group 200 according to the position of a finger. FIGS. 7 and 8 are schematic views illustrating different examples of a decision region 220.

In the changing process of the display form of the content group 200 by the information processing apparatus 100, the display changing section 140 decides first at step S100 whether or not a finger F which is an operating body is positioned within a proximity region. In the present embodiment, a region from the display face of the display section 114 to a position spaced upwardly in a vertical direction by a predetermined distance is determined as a proximity region as seen in FIG. 6. The predetermined distance which defines the proximity region is smaller than a maximum distance at which the detection section 112 can detect the finger F, and can be set suitably in response to the specifications of the device and a liking of the user. The display changing section 140 compares the proximity distance calculated based on a result of detection by the detection section 112 and the predetermined distance with each other. If the proximity distance is shorter than the predetermined distance, then the display changing section 140 decides that the finger F is positioned within the proximity region, and executes a process at step S110. On the other hand, if the proximity distance is equal to or greater than the predetermined distance, then the display changing section 140 decides that the finger F is positioned outside the proximity region, and repeats the process at step S100.

If it is decided that the finger F is positioned within the proximity region, then the display changing section 140 decides at step S110 whether or not the finger F is positioned within a decision region. The decision region is set for each of the content groups 200 as described hereinabove and is used for decision of whether or not the changing process of the display form of the content group 200 is to be executed. The decision region is set so as to include a corresponding one of the content groups 200.

For example, a rectangular decision region 220 can be set around the content group 200 as seen in FIG. 7. In the case where the finger F is not positioned within the decision region 220, the display form of the content group 200 corresponding to the decision region 220 is not changed, and the content piles 210 remain in a state in which they overlap with each other. On the other hand, in the case where the finger F is positioned within the decision region 220, the display form of the content group 200 corresponding to the decision region 220 changes such that the content piles 210 are spread as seen on a right side figure in FIG. 7 such that information described on the content piles 210 can be confirmed. Thereafter, if the finger F is moved to the outside of the decision region 220, then the spread content piles 210 gather to one place and restore the aggregated state.

Also it is possible to set the decision region 220 to a substantially circular region including the content group 200, for example, as seen in FIG. 8. Also in this instance, similarly as in the case of the example of FIG. 7, in the case where the finger F is not positioned within the decision region 220, the display form of the content group 200 corresponding to the decision region 220 is not changed, and the content piles 210 remain in a state in which they overlap with each other. On the other hand, in the case where the finger F is positioned within the decision region 220, the display form of the content group 200 corresponding to the decision region 220 changes such that the content piles 210 are spread as seen on a right side figure in FIG. 8 such that information described on the content piles 210 can be confirmed. Thereafter, if the finger F is moved to the outside of the decision region 220, then the spread content piles 210 gather to one place and restore the aggregated state.

It is to be noted that the shape, size and so forth of the decision region 220 are not limited to those of the examples of FIGS. 7 and 8 but can be modified suitably. Further, in the case where the content piles 210 are displayed in a spread state as seen in the right figure of FIG. 8, the decision region 220 may be expanded. An expanded decision region is denoted by reference character 220a. In the case where the size of the decision region 220 is fixed, if the spread of the content pile 210 is set so that it may be included in the decision region 220, then if the decision region 220 is not assured sufficiently, there is the possibility that an overlap of the content piles 210 may remain then even if the content pile 210 is expanded. If such an overlap as just described remains, then information described on the content piles 210 cannot be confirmed sufficiently. However, if the decision region 220 is set to an excessively great region, then there is the possibility that, even if the finger F is positioned spaced away from the content group 200, it may be positioned within the decision region 220, resulting in hardness to operate.

If it is assumed that the spread of the content pile 210 is permitted to extend to the outside of the decision region 220, then when the content piles 210 spread, it is estimated that some content piles 210 may come out of the decision region 220. At this time, if the user tries to select the content pile 210 positioned outside the decision region 220, then the before the finger F is positioned outside the decision region 220 to select the content pile 210, the content piles 210 enter an aggregated state. Therefore, there is a problem that the content pile 210 cannot be selected. Therefore, the problems described may be solved by changing the size of the decision region 220 in response to the spread of the content piles 210.

Referring back to FIG. 5, if it is decided at step S110 that the finger F is positioned within the decision region 220 of the content group 200 set as described above, the display changing section 140 determines to change the display form of the content group 200 at step S120. When the finger F is positioned within the proximity region and within the decision region 220, it is considered that the user places the finger F in the proximity of the display face and tries to select a content pile 210. Therefore, the content piles 210 are displayed such that they are spread from the mutually overlapping aggregated state to decrease the overlap of the content piles 210 to such a degree that information described on each content pile 210 can be visually observed in order that the user may visually observe a desired content pile 210. It is to be noted that, in the case where the finger F is not positioned in the decision region 220 at step S110, then the display form of the content group 200 is not changed, and the processing from step S100 is repeated.

If the display form of the content group 200 is changed into the state in which the content piles 210 are spread at step S120, then the display changing section 140 further decides at step S130 whether or not the finger F contacts with the display face. When the value of the capacitance which is a result of the detection of the detection section 112 is higher than a value of the capacitance which is supposed to be upon contact, the display changing section 140 estimates that the finger F contacts with the display face. At this time, if a content pile 210 exists at the position of the display face at which the finger F contacts, then the display changing section 140 executes a process associated with the content pile 210 at step S140. For example, if a content is associated with the content pile 210, then the if the content pile 210 is selected, then the content is executed.

On the other hand, if contact with the display face is not detected at step S130, then the processing beginning with step S110 is repeated. Thereafter, for example, if the finger F is spaced away from the display face and brought out of the position in the proximity region, then the display changing section 140 collects the spread content piles 210 back to one place as seen in the right figure in FIG. 6 such that the content piles 210 are displayed in an aggregated state, i.e., the content piles are reverted to the collapsed formation. In this manner, the information processing apparatus 100 according to the present embodiment changes the display form of the content group 200 in response to the proximity distance between the finger F and the display face.

The changing process of the display form of the content group 200 by the information processing apparatus 100 according to the present embodiment has been described. By such a process as described above, the user can carry out selection of a content group 200 and browsing of information described on the content piles 210 which configure the selected content group 200 can be carried out only by changing the position of a finger with respect to the display face. Further, also it is possible to execute selection of a desired content pile 210 and a process associated with the content pile 210 by contacting the finger F with the content pile 210.

Figure 9:
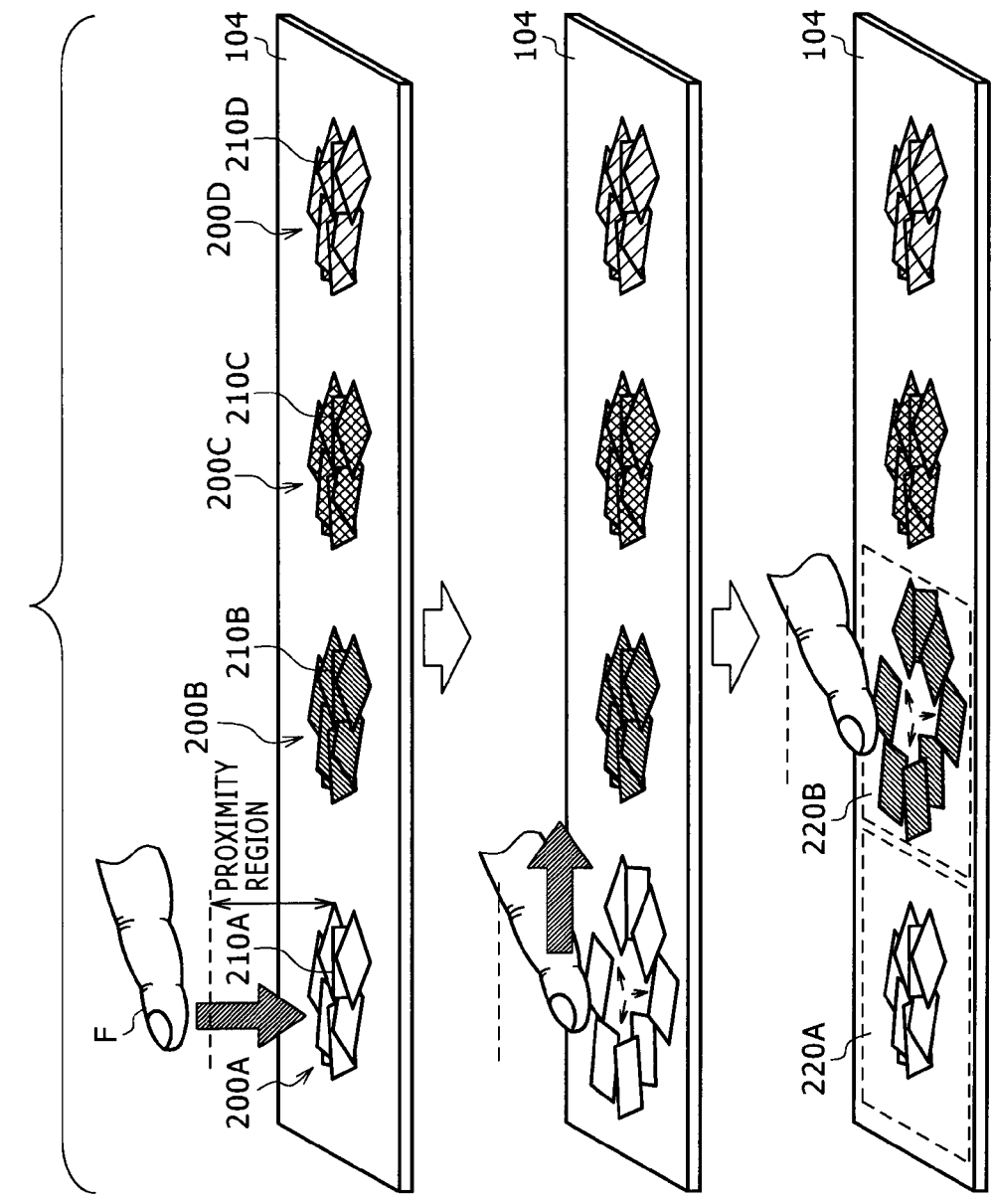
FIG. 9 is a schematic view illustrating a display changing process of a content pile list by the information processing apparatus.

For example, when a plurality of content groups 200A to 200D are displayed as a content pile list on the display section 114 as seen in FIG. 9, the user would hold up the finger F above the content group 200A and moves the finger F so as to approach the display face on which the content group 200A is displayed as seen on the upper stage in FIG. 9. If the finger F is positioned within the proximity region, then the content piles 210A of the content group 200A which has been in an aggregated state are displayed such that they are spread so that description of the content piles 210A can be visually observed as seen on the middle stage in FIG. 9. In this state, the user can select one of the content piles 210A which configure the content group 200A to execute a process associated with the selected content pile 210A.

It is assumed that the user thereafter moves the finger F in the rightward direction in the plane of the figure while the finger F is kept within the proximity region. While the finger F remains positioned in the decision region 220A of the content group 200A, the content group 200A is displayed in a state in which the content piles 210A are spread. If the finger F is brought out of the decision region 220A of the content group 200A, then the content group 200A is displayed in a state in which the content piles 210A are aggregated at one place. Then, if the finger F is further moved in the rightward direction along the plane of the figure until it is positioned in the decision region 220B corresponding to the content group 200B, then the content piles 210B which configure the content group 200B are displayed such that they are spread so that description of the content piles 210B can be visually observed as seen on the lower stage in FIG. 9. Accordingly, each of content groups 200A to 200D may have an associated decision region.

It is to be noted that, in the case where the content groups 200A to 200D are displayed as such a content pile list as described above on the display section 114, for example, only one of the content groups of the content pile list may be expanded by proximity positioning of the finger F. For example, if the position of the finger F is detected across the content groups 200A and 200B, then a content group corresponding to the decision region which includes a position at which that one of the proximity distances detected in the decision regions 220A and 220B corresponding to the content groups 200A and 200B is in the minimum is expanded. Consequently, it can be prevented that a plurality of content groups are expanded to complicate the display or it becomes difficult for the user to recognize a group to which content piles 210 belong.

Further, even if, after the content group 200 is expanded by positioning of the finger F in the proximity region of the same, the finger F is displaced from the proximity region or the decision region 220, the content group 200 expanded at present may not be closed until some other content group 200 is expanded.

In this manner, the information processing apparatus 100 according to the present embodiment changes the display form of the content group 200 in response to the proximity distance between the finger F and the display face. Consequently, by aggregating and representing the content piles 210 as a content group 200, the macroscopic overlooking property can be increased. Further, since the content group 200 can be expanded in response to the proximity state of the finger F to confirm information described on the content piles 210, also the microscopic overlooking property can be enhanced.

<2. Variation>

The information processing apparatus 100 can apply the changing process of the display form of the content group 200 described above as a basic process to various situations or develop the changing process. In the following, several applications of the changing process of the display form of a content group 200 are described with reference to FIGS. 10 to 18.

[Display Example of a Content Group (Display on a Map)]

A content group 200 formed from content piles 210 associated with contents is an aggregate of contents which have some relationship to each other such as the substance. The content group 200 also is one great object which represents the relationship, and if a user looks at the content group 200, then it can recognize an aggregate of what content piles 210 the content group 200 is. Therefore, it is possible to provide information common to the content piles 210 which configure the content group 200 such that the information can be visually recognizes readily in association with other information displayed on the display apparatus 104.

Figure 10:
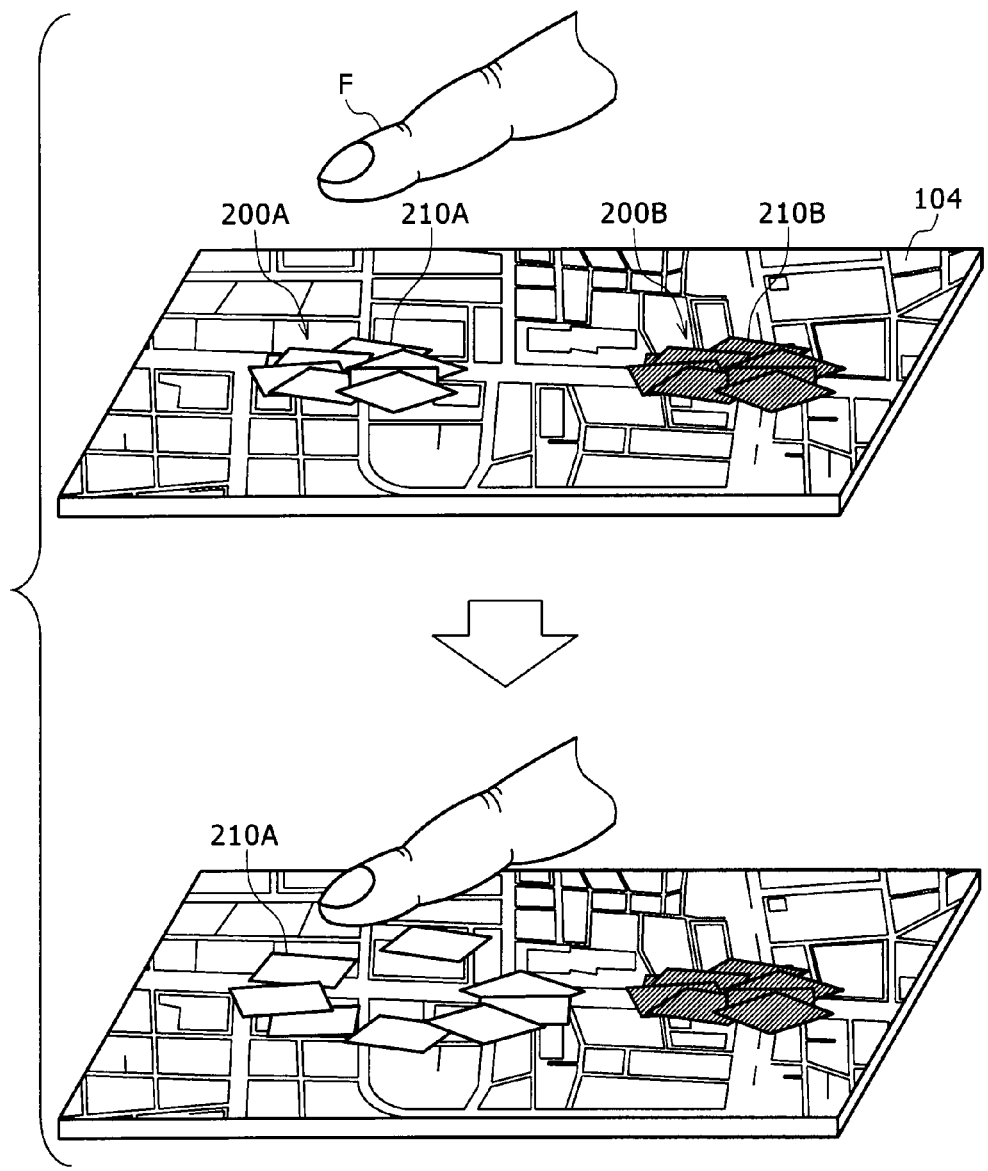
FIG. 10 is a schematic view showing an example of a display image of map information and related content groups by the information processing apparatus.

For example, it is assumed that the other information displayed on the display apparatus 104 is map information as seen in FIG. 10. Then, contents incidental to the map information are represented by content piles 210, and the content piles 210 are grouped based on a predetermined rule to produce the content group 200. It is possible for the information processing apparatus 100 to automatically classify the content piles 210 in accordance with a predetermined rule to produce the content group 200, and also it is possible for a user to classify the content piles 210 to produce the content group 200. The contents incidental to the map information may be images, music or photographs relating to place names or position information or town information such as shops or facilities or the like. Such pieces of information are grouped with position information to produce a content group 200, and the content group 200 is displayed at a position corresponding to the map information displayed on the display apparatus 104 as seen in an upper view of FIG. 10.

In FIG. 10, content groups 200A and 200B are disposed at two positions of the displayed map information. The content groups 200A and 200B are configured from content piles 210A and 210B associated with contents relating to the positions at which the content groups 200A and 200B are displayed, respectively. If the user positions a finger F thereof in the proximity of a content group displayed at a position whose information is to be acquired, for example, in the proximity of the content group 200A, then the content group 200A is expanded into a spread state. Consequently, information described on the content piles 210A which configure the content group 200A can be visually observed.

The user can effectively browse information associated with position information by expanding a content group 200 displayed on the map information as occasion demands. Further, when the user wants to display the map information and a content group 200 on the same screen image, the display space can be utilized effectively.

[Expansion of a Content Group]

(Expansion of a Content Group in Response to the Proximity Distance)

In the changing process of the display form of the content group 200 based on FIGS. 5 to 8, a content group 200 is expanded when the proximity distance between the operating body and the display face becomes smaller than the predetermined distance, that is, when the operating body is positioned within the proximity region and positioned in the decision region 220. At this time, although the degree of expansion of the content group 200 is fixed, for example, also it is possible to vary the degree of the expansion of the content group 200 in response to the proximity distance.

Figure 11:
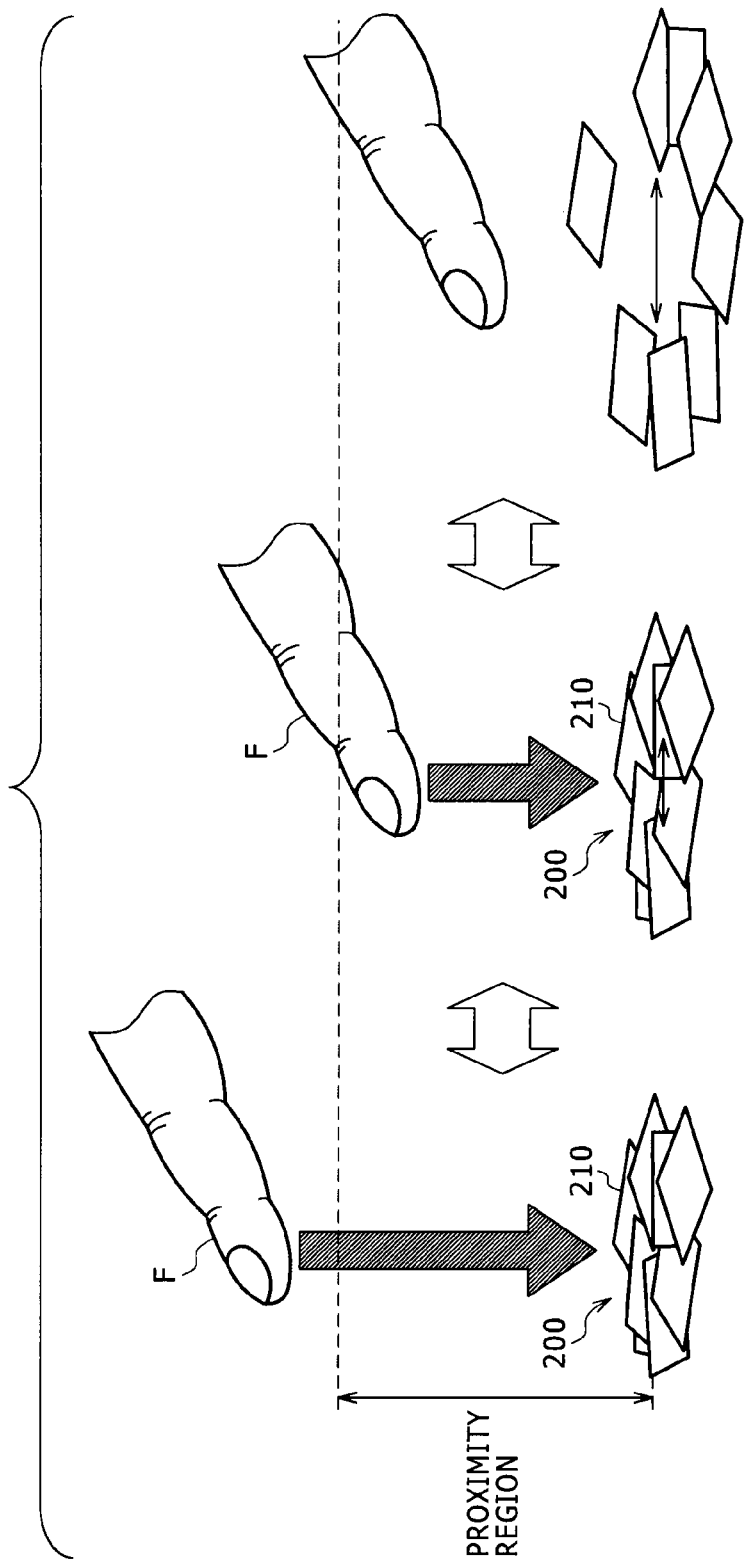
FIG. 11 is a schematic view showing an example of a display image by the information processing apparatus when the spread of a content group is varied in response to a proximity distance.

It is assumed that, for example, if the finger F is not positioned in the proximity region as seen in FIG. 11, then the content group 200 is displayed in an aggregate state in which the content piles 210 overlap with each other. Thereafter, if the finger F enters the proximate region, then the content group 200 gradually expands, and as the finger F approaches the display face, the spread of the content group 200 becomes greater. That is, the degree of expansion of the content group 200 becomes greater as the calculated proximity distance becomes smaller. By changing the spread of the content group 200 in response to the proximity distance in this manner, the causal relationship of the proximity distance between the finger F and the display face can be recognized readily.

It is to be noted that, while, in the example illustrated in FIG. 11, the spread of the content group 200 increases as the finger F approaches the display face, the present disclosure is not limited to this. For example, the content piles 210 which configure the content group 200 may be aggregated as the finger F approaches the display face. Or, a position spaced by a predetermined distance from the display face in the proximity region may be set as a boundary position. Then, after the finger F enters the proximity region, before the finger F reaches the boundary position, the spread of the content group 200 may be increased as the finger F approaches the display face. However, if the finger F further approaches the display face across the boundary position, then the content piles 210 which configure the content group 200 may be aggregated as the finger F approaches the display face.

Such expansion of the content group 200 may be determined in response to a final operation carried out by an operation of the user approaching the finger F. For example, in the case where a content associated with one of the content piles 210 which configure the content group 200 is to be executed finally, it is desirable to be able to visually observe individual ones of the content piles 210 to allow selection of the same. Therefore, as the finger F approaches the display face, the spread of the content group 200 is increased. On the other hand in the case where unity as one of the content groups 200 is to be selected finally, it is desirable to be capable of selecting a content group 200 as unity. In this instance, in the state in which the finger F contacts with the display face, the content piles 210 which configure the content group 200 are aggregated.

(Array of Content Piles)

While the case in which the degree of the spread of a content group 200 is changed in response to the proximity distance between the finger F and the display face is described with reference to FIG. 11, also it is possible to further divide the proximity region such that the display form of a content group 200 is changed in response to each divisional region. For example, it is assumed that the proximity region is divided into two divisional regions of an expansion region and a selective display region (i.e., a selection region), with each region corresponding to a display form. In the example illustrated, the divisional region from the display face to a position spaced by a predetermined distance from the display face is determined as the selective display region, and the divisional region spaced farther than the selective display region from the display face is determined as the expansion region. In the expansion region, the changing process of increasing, when the finger F is positioned in the expansion region, the spread of a content group 200 in response to the proximity distance between the finger F and the display face as described hereinabove with reference to FIG. 11 is carried out. Meanwhile, in the selective display region, the process of displaying, when the finger F is positioned in the selective display region, the content piles 210 of the expanded content group 200 such that the user can select a content pile 210 readily is carried out.

Figure 12:
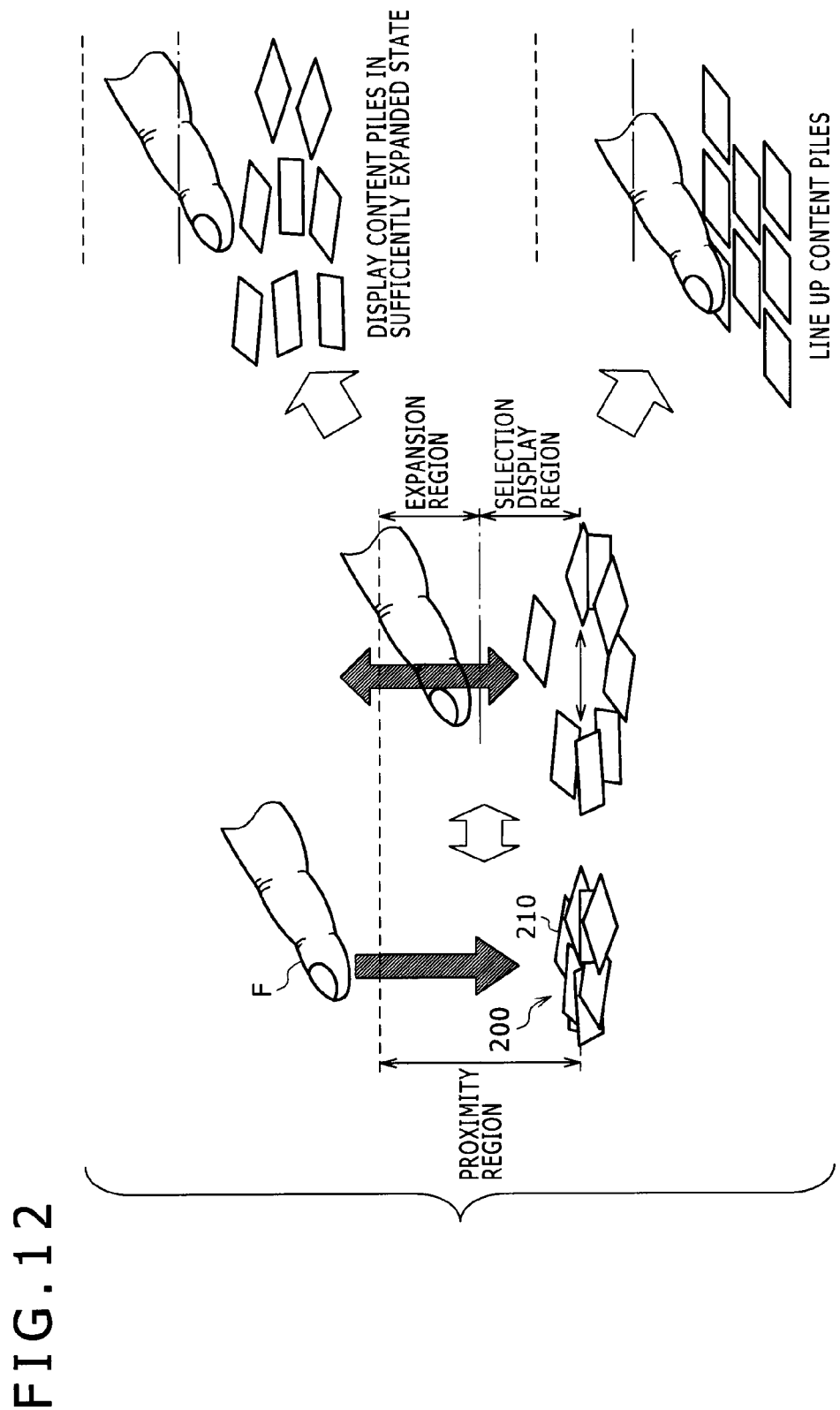
FIG. 12 is a schematic view showing an example of change of the display mode in response to the position of a finger within a proximity region by the information processing apparatus.

When the finger F is positioned outside the proximity region as seen in FIG. 12, the content group 200 is displayed in an aggregate state in which the content piles 210 overlap with each other. If the finger F thereafter enters the proximity region, then while the finger F is positioned in the expansion region, the spread of the content group 200 gradually increases, and as the finger F approaches the display face, the spread of the content group 200 increases. If the finger F further approaches the display face until it is positioned from the expansion region into the selective display region, then the display changing section 140 changes the display position of the content piles 210 so that the individual content piles 210 which configure the content group 200 can be selected readily by the user.

For example, if the finger F is positioned in the selective display region as seen at a right upper portion of FIG. 12, then the content piles 210 may be spread sufficiently so that they can individually be selected readily. In the expansion region, the content piles 210 spread annularly around the center of the spread at the central position of the aggregation state. In contrast, in the case where the finger F is positioned in the selective display region, the content piles 210 are disposed such that they are spaced from each other with a sufficient distance assured between individual ones thereof so that it becomes easier to select the content piles 210 which have been arrayed annularly. Or, in the case where the finger F is positioned in the selective display region, the content piles 210 may be displayed in a lined up state or evenly spaced and arranged so that it becomes further easier to select the content piles 210 which have been arrayed annularly as seen at a right lower portion of FIG. 12. In this manner, it is possible to make it easy to select individual ones of the content pile 210.

(Expansion of a Content Group in Response to a Moving Speed)

In the case where the proximity distance between the operating body and the display face can be detected as in the information processing apparatus 100 according to the present embodiment, also it is possible to change the display form of a content group 200 in response to a distance variation, that is, in response to the moving speed of the operating body. For example, it is possible to change the display form of a content group 200 using a pseudo wind pressure representation based on the moving speed of an operating body.

Figure 13:
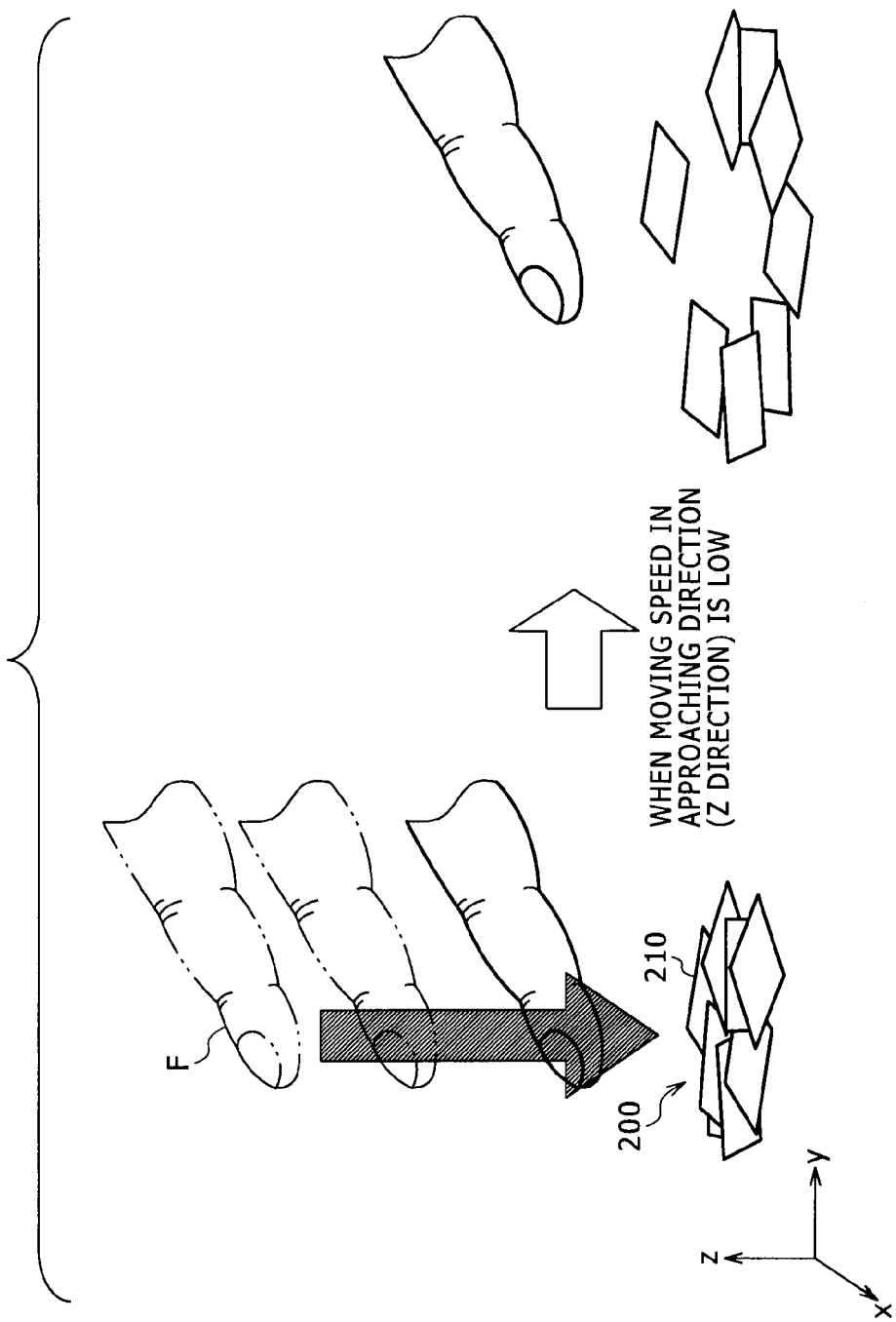
FIG. 13 is a schematic view showing an example of a display image of a content group by the information processing apparatus when the moving speed of a finger in an approaching direction is low.
Figure 14:
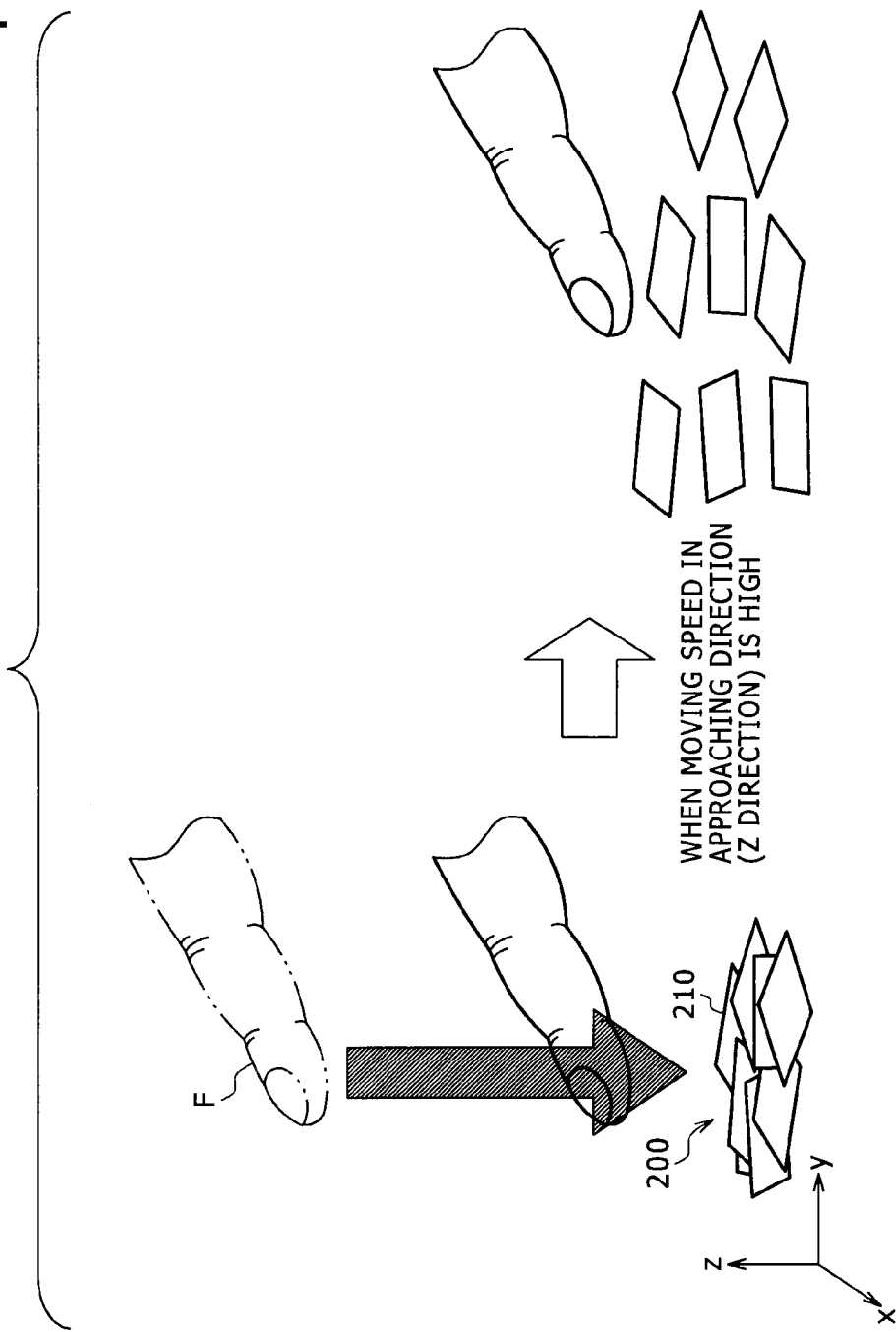
FIG. 14 is a schematic view showing an example of a display image of a content group by the information processing apparatus when the moving speed of a finger in an approaching direction is high.

In the case where the moving speed of the finger F which is an operating body is lower than a reference speed, since the finger F is moving moderately, it is considered that the wind pressure artificially applied from the finger F to the content group 200 displayed on the display screen is low. Accordingly, the spread of the content group 200 when the finger F advances into the proximity region and approaches the display face is small as seen in FIG. 13. On the other hand, if the moving speed of the finger F is higher than the reference speed, then since the finger F is moving swiftly, it is considered that the wind pressure artificially applied from the finger F to the content group 200 displayed on the display face is high. Accordingly, the spread of the content group 200 when the finger F advances into the proximity region and approaches the display face is large as seen in FIG. 14.

In this manner, the display changing section 140 changes the display such that the content piles 210 are spread in response to the speed at which the finger F moves in a vertical direction with respect to the display face, that is, in the z-axis direction. Consequently, the user can explicitly carry out expansion of the content group 200.

Also it is possible to change a selection object to be selected when the finger F is brought into contact with the display face in response to the moving speed of the finger F. For example, in the case where the finger F is brought into contact with the display face while the moving speed of the finger F is lower than a reference speed, individual ones of the content piles 210 which configure the content group 200 are selected. On the other hand, in the case where the finger F is brought into contact with the display face while the moving speed of the finger F is higher than the reference speed, then the content group 200 is selected. Also it is possible to determine a selection object in response to the moving speed of the finger F in this manner.

While the detection section 112 of the information processing apparatus 100 according to the present embodiment can acquire a distance, even where a sensor which can detect only a degree of proximity between the finger F and the display face is used, similar operation to that described above can be achieved. For example, if a state in which the finger F is moved little in the z-axis direction but is recognized in a standby state for more than a predetermined period of time from a state of a change of the degree of proximity of the finger F and the finger F is thereafter brought into contact with the display face, then the display changing section 140 selects individual ones of the content piles 210 which configure a content group 200. On the other hand, if the finger F is brought into contact with the display face while the standby state of the finger F is not recognized for more than the predetermined period of time, then the display changing section 140 selects the content group 200. In this manner, even in the case where a proximity distance cannot be acquired, the selection mode can be changed over.

Also it is possible for the display changing section 140 to be capable of recognizing from the moving speed of the finger F being moved by the user whether individual ones of the content piles 210 are to be selected or the content group 200 is to be selected. For example, if it is decided from the moving speed of the finger F that the mode in which individual ones of the content piles 210 are to be selected is established, then the display changing section 140 carries out highlight display of the content pile 210 to which the finger F is positioned most proximately. On the other hand, if it is decided from the moving speed of the finger F that the mode in which the content group 200 is to be selected is established, then the display changing section 140 carries out highlight display of the content group 200. In this manner, which one of the selection modes is established can be conveyed to the user through highlight display.

[Stirring Operation of Content Piles]

On content piles 210 which configure a content group 200, information regarding contents associated with the content piles 210 is described. However, in the case where the finger F is not positioned in the proximity region, the content group 200 is displayed in an aggregated state and the content piles 210 are displayed in an overlapping relationship with each other. Consequently, information of the content piles 210 other than the content pile 210 positioned on the top of the content group 200 cannot be visually observed. Therefore, in the information processing apparatus 100 according to the present embodiment, when the position of the finger F in the proximity of the display face in the neighborhood of the content group 200 is moved, the content piles 210 which configure the content group 200 are shuffled and then displayed so that the hidden content piles 210 can be displayed.

Figure 16:
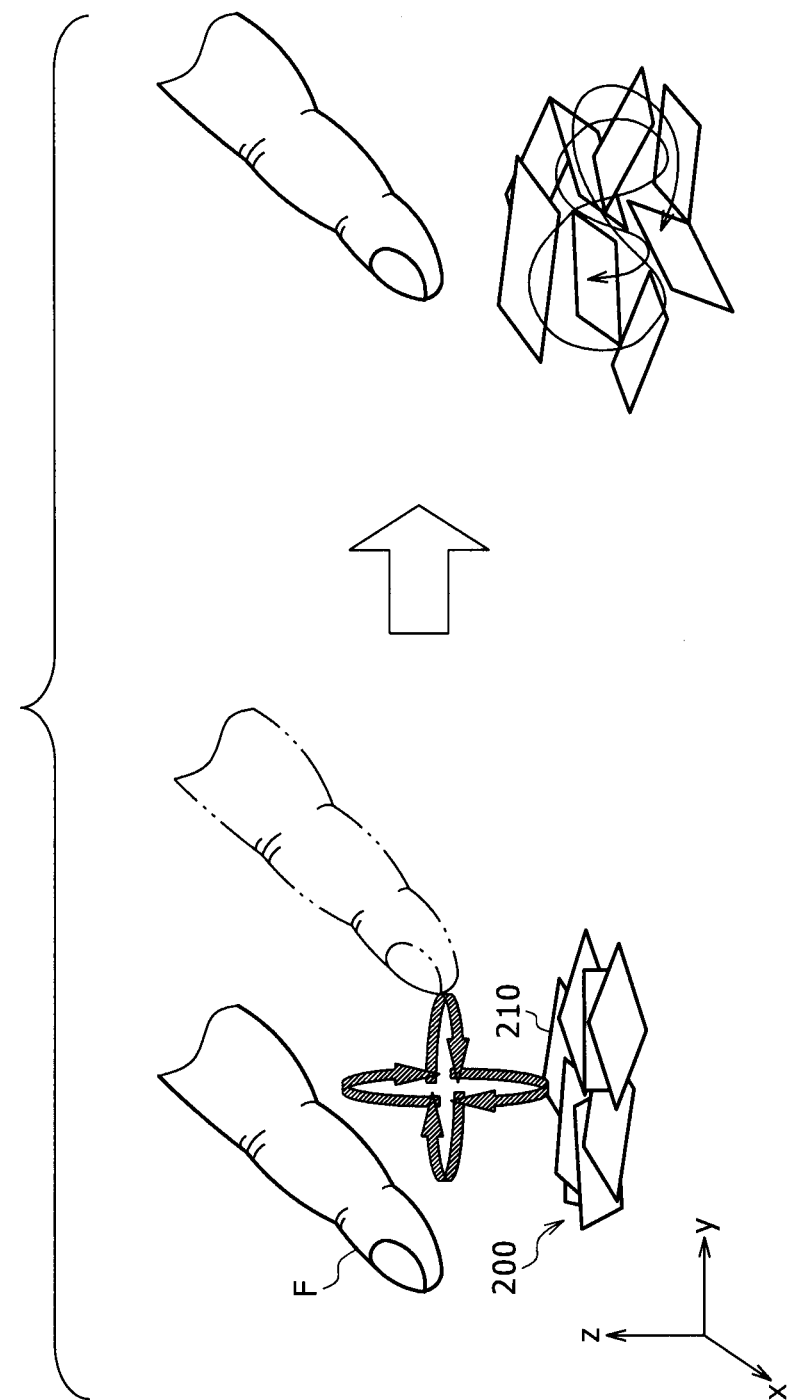
Figure 17:
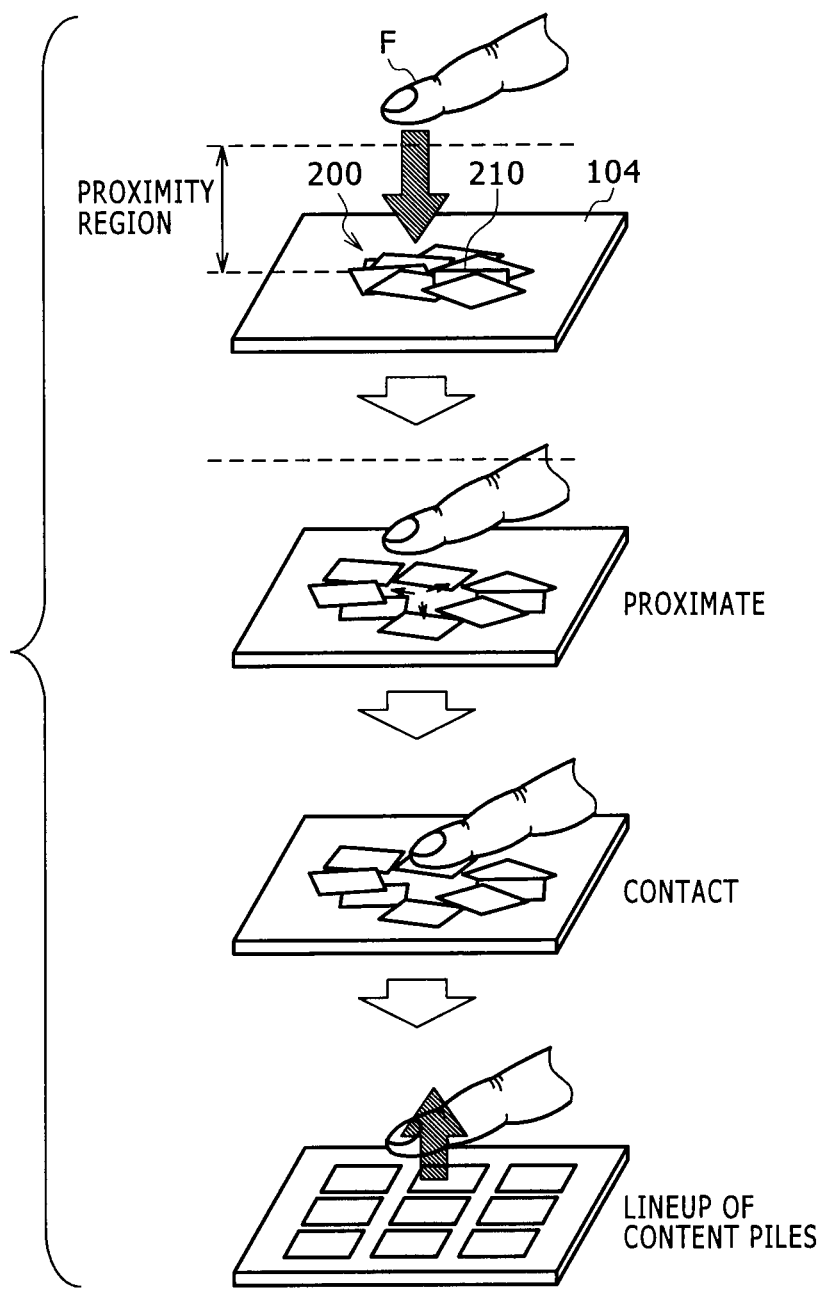

For example, if the detection section 112 cannot detect information in the approaching direction, that is, in the z-axis direction, a movement of the finger F on the xy plane is acquired, and the display changing section 140 shuffles (i.e. rearranges) and displays the content piles 210 in response to the movement. On the other hand, if the detection section 112 can detect information in the approaching direction, that is, in the z-axis direction, a motion vector of the finger F can be detected as three-dimensional information as seen in FIG. 16. Consequently, if the user carries out such a gesture as to three-dimensionally stir the content piles 210 above the display face, then the display changing section 140 three-dimensionally shuffles and displays the content piles 210. Consequently, the content piles 210 overlapping with and hidden by each other can be displayed so as to be visually observed.

It is to be noted that, while the shuffle of the content piles 210 described above is carried out in response to the movement of the finger F, the present disclosure is not limited to this, and the shuffle may be carried out, for example, such that the content piles 210 are moved at random independently of the movement of the finger F.

[Interaction after Content Group Expansion]

It has been described that, by expanding and displaying a content group 200 when the finger F is positioned in the proximity region, a display process is carried out so that information of the content piles 210 which configure the content group 200 can be visually observed. Also an interaction after a content group 200 is expanded in this manner can be set in various manners.

For example, a user holds a finger F thereof above a content group 200 and then moves the finger F toward the display face on which the content group 200 is displayed. When the finger F is positioned into the proximity region, the content piles 210 of the content group 200 having been in an aggregated state are spread and displayed such that description on the content piles 210 can be visually observed. If, in this instance, the user brings the finger F into contact with the display face and then spaces the finger F away from the display face, then the content piles 210 are displayed in a lined up state as seen in a lower view of FIG. 17, for example, in a selection formation. By lining up the content piles 210 in this manner, the user can recognize the substance displayed on the content piles 210 readily.

The lining up of the content piles 210 may be executed, for example, when the finger F is brought into contact with and taps on one of the content piles 210 which configure the content group 200 or when the finger F is brought into contact with and taps on the decision region 220 corresponding to the content group 200. Further, while the display changing process of lining up the content piles 210 is executed by tapping on the display face with the finger F, the display changing process may be executed otherwise, for example, when the finger F is kept in contact with the display face for more than a predetermined period of time and then is spaced away from the display face, that is, when a long-time pressing operation is carried out.

Also it is possible to further expand, after the finger F is positioned in the proximity region to display the content piles 210 of the content group 200 having been in an aggregated state now in an expanded state, the expanded content group 200 such that the individual content piles 210 can be selected directly.

For example, the user would hold the finger F above a content group 200 and then move the finger F to the proximity of the display face on which the content group 200 is displayed as seen in FIG. 18. When the finger F is positioned into the proximity region, the content piles 210 of the content group 200 having been in an aggregated state are displayed in an expanded state such that description on the content piles 210 can be visually observed. If, in this state, the user brings the finger F into contact with the display face and then spaces the finger F away from the display face, then the content piles 210 are displayed in a lined up state similarly as in FIG. 17.

Figure 15:
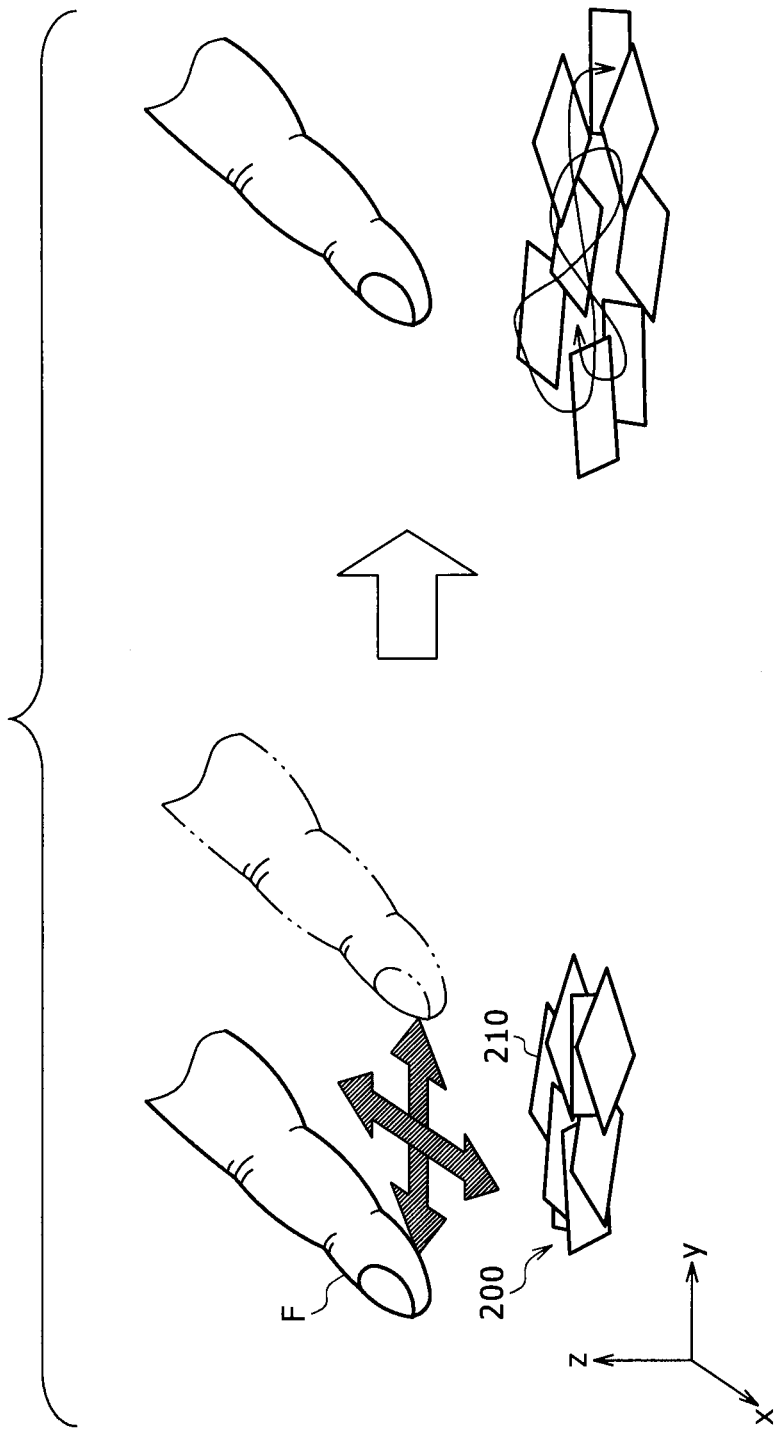
FIGS. 15 and 16 are schematic views showing different examples of a stirred display image of a content group by the information processing apparatus.

On the other hand, after the finger F is positioned in the proximity region to expand the content group 200, the user would carry out a gesture of stirring the content pile 210 above the display face as seen in FIGS. 15 and 16 to further expand the expanded content group 200. That is, a repeated movement of the finger may be detected in the x, y, or z axis directions. Thereafter, if the user brings the finger F into contact with and taps on one of the content piles 210, then a content corresponding to the content pile 210 selected by the tapping is executed. By determining a display changing process to be carried out when a content pile 210 is tapped in response to an expanded state of the content group 200 in this manner, the operability of the user can be improved. It is to be noted that, although the display changing process is carried out when tapping is carried out, also in the present example, the display changing process may be executed, for example, when the finger F is kept in contact with the display face for more than a predetermined period of time and then is spaced away from the display face, that is, when a long-time pressing operation is carried out.

The information processing apparatus 100 according to the present embodiment and the display changing process of a content group 200 by the information processing apparatus 100 have been described. In such an information processing apparatus 100 as described above, the display form of a content group 200 displayed on the display face of the display section 114 is changed based on the proximity distance between the operating body and the display face. Consequently, before a content pile 210 which configures a content group 200 is selected, the user can estimate a process to be executed later or a process which can be executed.

In the interface of the information processing apparatus 100 according to the present embodiment, information of a content such as, for example, a thumbnail image, is represented as a content pile 210, and content piles 210 of those contents which relate to each other are grouped and represented as a content group 200. Then, if a finger F is positioned near to the content group 200 whose content piles 210 are displayed in an aggregated relationship, then the content group 200 is expanded before the finger F is brought into contact with the display face. Consequently, the user can overlook information described on the content piles 210. Consequently, the user can recognize and operate the information of a content pile 210 without establishing a browse mode for confirming the information of the content pile 210, and also operation steps can be reduced.

Further, by changing the display of the content pile 210 using a gesture of positioning the finger F in the proximity of the display face, not only a changing process of the display of the content group 200 but also a selection process of a content group 200 or a content pile 210 and so forth can be carried out by a sequence of operations.

While a preferred embodiment of the present disclosure has been described above with reference to the accompanying drawings, the present disclosure is not limited to the embodiment. It is apparent that a person skilled in the art could have made various alterations or modifications without departing from the spirit and scope of the disclosure as defined in claims, and it is understood that also such alterations and modifications naturally fall within the technical scope of the present disclosure.

The present disclosure contains subject matter related to that disclosed in Japanese Priority Patent Application JP 2010-169103 filed in the Japan Patent Office on Jul. 28, 2010, the entire content of which is hereby incorporated by reference.

What is claimed is:

1. An apparatus comprising:
a detecting unit detecting an operating member placed in proximity to a display device;
a changing unit changing a display formation of a plurality of objects displayed on the display device based on the detected operating member; and
a display generator displaying the objects on the display device according to the changed display formation,
wherein when the operating member is not within a proximity region which is a region from the display device to a predetermined distance from the display device, the display generator displays the objects on the display device in a collapsed formation where the objects overlap one another in a content pile, and
wherein when the operating member is within the proximity region, the changing unit changes the display formation to an expanded formation where the objects are expanded outward, by a degree of expansion, in a radial fashion from the content pile.

2. The apparatus of claim 1, wherein the changing unit changes the degree of expansion of the objects according to a distance between the detected operating member and the display device when the operating member is within the proximity region.

3. The apparatus of claim 2, wherein the changing unit changes the display formation such that the degree of expansion becomes greater as the distance between the detected operating member and the display device becomes smaller.

4. The apparatus of claim 2, wherein the proximity region is divided into a plurality of regions, each of the plurality of regions corresponding to a display formation.

5. The apparatus of claim 4, wherein the proximity region comprises:
an expansion region for changing the display formation to the expanded formation for expanding the objects outward by the degree of expansion according to the distance between the detected operating member and the display device; and
a selection region for changing the display formation to a selection formation, where the objects are evenly spaced and arranged on the display device for selection by the operating member.

6. The apparatus of claim 1, wherein the changing unit changes the display formation to an expanded formation where the objects are expanded outward by a degree of expansion according to a speed of movement of the operating member within the proximity region.

7. The apparatus of claim 6, wherein the changing unit changes the display formation such that the degree of expansion becomes greater as the speed of movement becomes greater.

8. The apparatus of claim 7, wherein the content is map content.

9. The apparatus of claim 1, wherein the changing unit reverts the display formation of the objects to the collapsed formation when the operating member is removed from the proximity region.

10. The apparatus of claim 1, wherein when the operating member is within the proximity region, the changing unit determines whether the operating member is located within a content manipulation region associated with the content pile, the content manipulation region being a set region surrounding the content pile.

11. The apparatus of claim 10, wherein the content manipulation region is a rectangular region or a circular region.

12. The apparatus of claim 10, wherein the changing unit changes the display formation of the objects in the content pile when the operating member is determined to be both within the proximity region and located within the content manipulation region associated with the content pile.

13. The apparatus of claim 10, wherein the display generator displays a plurality of content piles, each of the content piles having an associated content manipulation region.

14. The apparatus of claim 10, wherein a size of the content manipulation region is set based on a density of displayed contents or other objects in a vicinity surrounding the content pile.

15. The apparatus of claim 1, wherein following detection of the operating member in the proximity region, when the detection unit detects contact between the operating member and a display face of the display device, and subsequently detects removal of contact between the operating member and the display face, the changing unit changes the display formation to a selection formation, in which the objects are evenly spaced and arranged on the display device for selection by the operating member.

16. The apparatus of claim 1, wherein following detection of the operating member in the proximity region, when the detection unit detects a repeated movement of the operating member in the x-axis, y-axis, or z-axis direction, and subsequently detects contact between the operating member and the display face, the display device executes, by an execution unit, a piece of content corresponding to a point of detected contact of the operating member on the display face.

17. The apparatus of claim 1, wherein the display generator displays the objects overlaying content on the display device.

18. The apparatus of claim 1, wherein the detecting unit detects the operating member in the x-axis, y-axis, or z-axis directions.

19. The apparatus of claim 18, wherein when the detection unit detects movement of the operating member in the x-axis and y-axis directions and does not detect movement in the z-axis direction, the changing unit changes the display formation of the objects by graphically rearranging the objects two-dimensionally, and the display generator displays the two-dimensionally shuffled objects.

20. The apparatus of claim 18, wherein when the detection unit detects movement of the operating member in the z-axis and either the x-axis or y-axis, the changing unit changes the display formation of the objects by graphically rearranging the objects three-dimensionally, and the display generator displays the three-dimensionally shuffled objects.

21. The apparatus of claim 1, wherein the content pile contains the plurality of objects having a shared trait.

22. The apparatus of claim 1, wherein the changing unit does not revert the display formation of the objects to the collapsed formation from the expanded format until a display formation of another content pile is changed to the expanded formation.

23. The apparatus of claim 1, wherein when the operating member is determined to be within the proximity region, the changing unit changes the display formation to the expanded formation with a degree of expansion corresponding to the distance between the detected operating member and the display device.

24. A method comprising:
   detecting an operating member placed in proximity to a display device;
   changing a display formation of a plurality of objects displayed on the display device based on the detected operating member; and
   displaying the objects on the display device according to the changed display formation,
   wherein when the operating member is not within a proximity region which is a region from the display device to a predetermined distance from the display device, the objects are displayed on the display device in a collapsed formation where the objects overlap one another in a content pile, and
   wherein when the operating member is within the proximity region, the display formation is changed to an expanded formation where the objects are expanded outward, by a degree of expansion, in a radial fashion from the content pile.

25. A tangibly-embodied non-transitory computer-readable storage device storing instructions which, when executed by a processor, cause a computer to perform a method for displaying a plurality of objects, comprising:
   detecting an operating member placed in proximity to a display device;
   changing a display formation of a plurality of objects displayed on the display device based on the detected operating member; and
   displaying the objects on the display device according to the changed display formation,
   wherein when the operating member is not within a proximity region which is a region from the display device to a predetermined distance from the display device, the objects are displayed on the display device in a collapsed formation where the objects overlap one another in a content pile, and
   wherein when the operating member is within the proximity region, the display formation is changed to an expanded formation where the objects are expanded outward, by a degree of expansion, in a radial fashion from the content pile.

* * * * *